United States Patent
Seo et al.

(10) Patent No.: US 10,263,825 B2
(45) Date of Patent: Apr. 16, 2019

(54) METHOD AND DEVICE FOR TRANSMITTING SYNCHRONIZATION SIGNAL FOR D2D (DEVICE TO DEVICE) COMMUNICATION IN WIRELESS COMMUNICATION SYSTEM

(71) Applicant: LG ELECTRONICS INC., Seoul (KR)

(72) Inventors: Daewon Seo, Seoul (KR); Hanbyul Seo, Seoul (KR); Hakseong Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 225 days.

(21) Appl. No.: 15/112,928

(22) PCT Filed: Sep. 16, 2014

(86) PCT No.: PCT/KR2014/008608
§ 371 (c)(1),
(2) Date: Jul. 20, 2016

(87) PCT Pub. No.: WO2015/119350
PCT Pub. Date: Aug. 13, 2015

(65) Prior Publication Data
US 2016/0337159 A1 Nov. 17, 2016

Related U.S. Application Data

(60) Provisional application No. 61/936,289, filed on Feb. 5, 2014, provisional application No. 61/936,853, filed
(Continued)

(51) Int. Cl.
*H04L 27/26* (2006.01)
*H04W 56/00* (2009.01)
(Continued)

(52) U.S. Cl.
CPC ....... *H04L 27/2662* (2013.01); *H04W 56/001* (2013.01); *H04W 56/002* (2013.01); *H04W 76/14* (2018.02); *H04W 84/042* (2013.01)

(58) Field of Classification Search
CPC . H04W 56/001; H04W 76/14; H04W 56/002; H04W 84/042; H04L 27/2662; H04L 27/2655
(Continued)

(56) References Cited

U.S. PATENT DOCUMENTS

| 2013/0142268 | A1* | 6/2013 | Gao | H04W 76/14 375/252 |
| 2014/0064263 | A1* | 3/2014 | Cheng | H04W 8/005 370/350 |

(Continued)

FOREIGN PATENT DOCUMENTS

| KR | 10-2012-0073147 A | 7/2012 |
| WO | WO 2013/081393 A1 | 6/2013 |

(Continued)

*Primary Examiner* — Rownak Islam
(74) *Attorney, Agent, or Firm* — Birch, Stewart, Kolasch & Birch, LLP

(57) ABSTRACT

The present invention relates to a method of detecting a synchronization signal for D2D (device to device) communication of a terminal in a wireless communication system. More particularly, the method includes detecting a first synchronization signal and a second synchronization signal on a specific sub-frame for a synchronization signal period set for D2D communication, wherein the first synchronization signal is generated based on a first of predefined sets of root indexes, the second synchronization signal is generated based on a second of predefined sets of root indexes, and the first set of root indexes and the second set of root indexes are made up of different indexes.

11 Claims, 18 Drawing Sheets

Related U.S. Application Data on Feb. 6, 2014, provisional application No. 61/938,675, filed on Feb. 11, 2014, provisional application No. 61/941,491, filed on Feb. 19, 2014, provisional application No. 61/968,364, filed on Mar. 21, 2014.

(51) Int. Cl.
*H04W 76/14* (2018.01)
*H04W 84/04* (2009.01)

(58) Field of Classification Search
USPC .................................................. 370/328, 329
See application file for complete search history.

(56) References Cited

U.S. PATENT DOCUMENTS

| | | |
|---|---|---|
| 2014/0321452 A1 | 10/2014 | Choi et al. |
| 2015/0055616 A1 | 2/2015 | Kim et al. |
| 2015/0124579 A1* | 5/2015 | Sartori ..................... H04J 11/00 370/210 |
| 2015/0304149 A1 | 10/2015 | Kim et al. |
| 2016/0112979 A1* | 4/2016 | Takano ................. H04W 76/14 370/336 |
| 2016/0374038 A1* | 12/2016 | Wang .................... H04L 5/0014 |

FOREIGN PATENT DOCUMENTS

| | | |
|---|---|---|
| WO | WO 2013/125887 A1 | 8/2013 |
| WO | WO 2013/125925 A1 | 8/2013 |
| WO | WO 2014/018333 A2 | 1/2014 |

* cited by examiner

FIG. 2
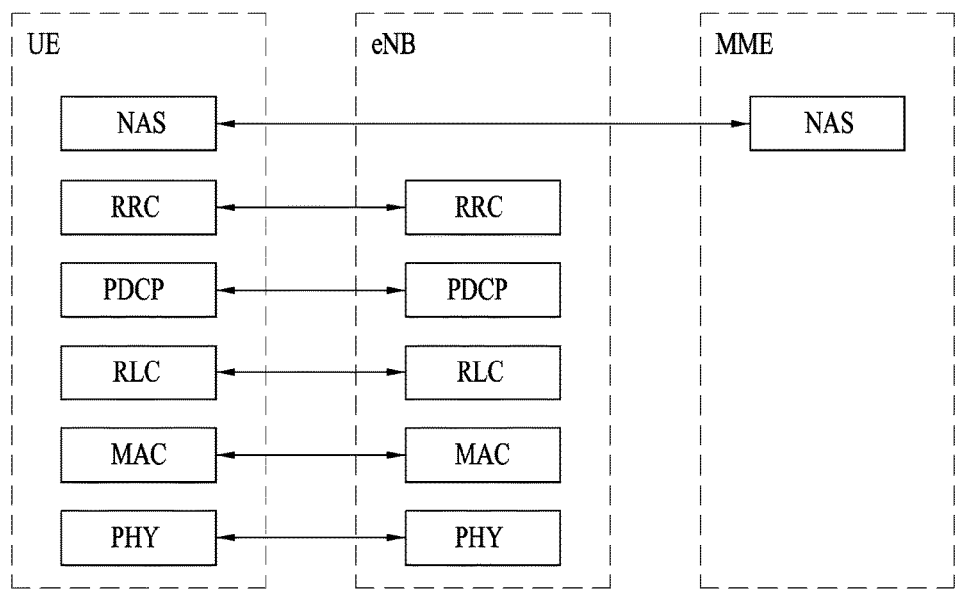
(a) control-plane protocol stack
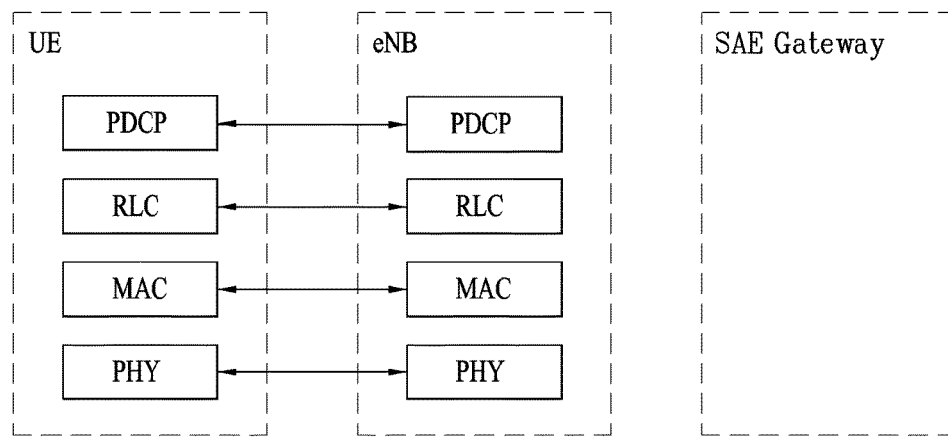
(b) user-plane protocol stack (a)

(b)

METHOD AND DEVICE FOR TRANSMITTING SYNCHRONIZATION SIGNAL FOR D2D (DEVICE TO DEVICE) COMMUNICATION IN WIRELESS COMMUNICATION SYSTEM

CROSS REFERENCE TO RELATED APPLICATIONS

This application is the National Phase of PCT International Application No. PCT/KR2014/008608, filed on Sep. 16, 2014, which claims priority under 35 U.S.C. 119(e) to U.S. Provisional Application No. 61/936,289, filed on Feb. 5, 2014; 61/936,853, filed on Feb. 6, 2014; 61/938,675, filed on Feb. 11, 2014; 61/941,491, filed on Feb. 19, 2014; and 61/968,364, filed on Mar. 21, 2014, all of which are hereby expressly incorporated by reference into the present application.

TECHNICAL FIELD

The present invention relates to a wireless communication system, and more particularly, to a method of transmitting a synchronization signal for D2D (device to device) communication in a wireless communication system and an apparatus therefor.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.4, 3, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

An object of the present invention is to provide a method of transmitting a synchronization signal for D2D (device to device) communication in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of detecting a synchronization signal, which is detected by a user equipment (UE) for D2D (device-to-device) communication in a wireless communication system, includes the step of detecting a first synchronization signal and a second synchronization signal in a specific subframe during a synchronization signal period set for the D2D communication. In this case, the first synchronization signal is generated based on a first root index set among predefined root index sets, the second synchronization signal is generated based on a second root index set among the predefined root index sets, wherein the first root index set and the second root index set are configured by a different index.

Preferably, the first synchronization signal can be located at a slot boundary between a first slot and a second slot of the specific subframe.

Preferably, the second synchronization signal can be located at a start symbol or an end symbol of the specific subframe. More preferably, the second synchronization signal can be further located at a slot boundary between a first slot and a second slot constructing the specific subframe. If the second synchronization signal is located at the start symbol of the specific subframe, the second synchronization signal can be configured to be located at two contiguous symbols.

Preferably, a transition symbol can be allocated to a start symbol or an end symbol of the specific subframe.

Preferably, the first synchronization signal can be used to obtain at least one of first time domain synchronization or first frequency domain synchronization for the D2D communication. More preferably, the second synchronization signal can be used to obtain at least one of second time domain synchronization or second frequency domain synchronization based on at least one of the detected first time domain synchronization and the first frequency domain synchronization.

Preferably, the first synchronization signal and the second synchronization signal can be determined by identification (ID) values different in each symbols according to a predefined pattern.

Preferably, the first synchronization signal and the second synchronization signal can be allocated using sequences of different lengths.

Preferably, an order of detecting the first synchronization signal and the second synchronization signal can be determined according to a priority predetermined in the UE.

Preferably, a size of the second index set is greater than a size of the first index set.

To further achieve these and other advantages and in accordance with the purpose of the present invention, according to a different embodiment, a user equipment detecting a synchronization signal for D2D (device to device) communication in a wireless communication system includes a radio frequency unit and a processor, the processor configured to detect a first synchronization signal and a second synchronization signal in a specific subframe during a synchronization signal period set for the D2D communication. In this case, the first synchronization signal is generated based on a first root index set among predefined root index sets, wherein the second synchronization signal is generated based on a second root index set among the predefined root index sets, and wherein the first root index set and the second root index set are configured by a different index.

Advantageous Effects

According to the present invention, it is able to efficiently transmit a synchronization signal for D2D (device to device) communication in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

FIG. 2 is a diagram showing the structure of a control plane and a user plane of a radio interface protocol between a User Equipment (UE) and an E-UTRAN based on the 3GPP radio access network standard;

BEST MODE

Mode for Invention

Figure 1:
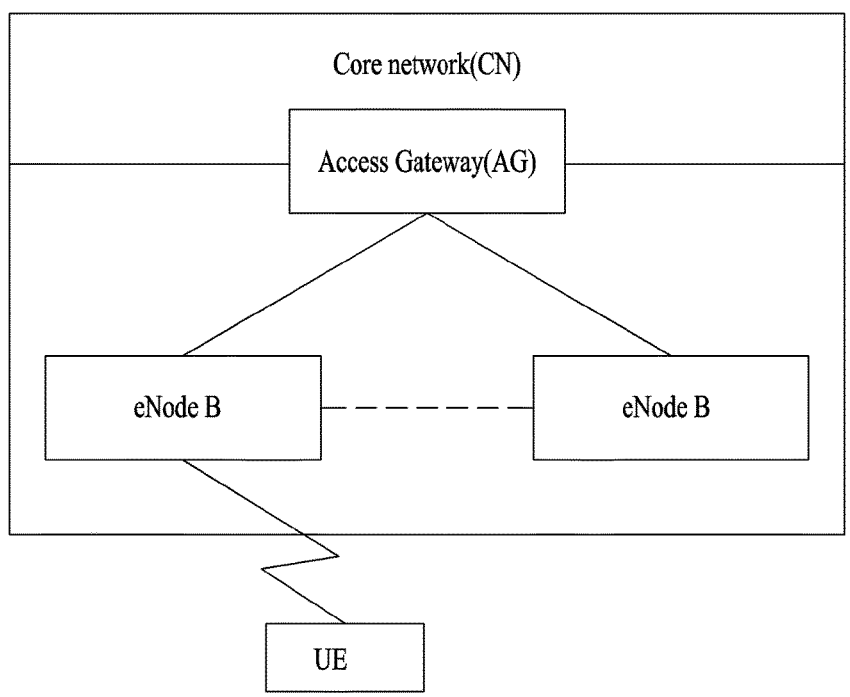
FIG. 1 is a schematic diagram showing a network architecture of an Evolved Universal Mobile Telecommunications System (E-UMTS) as an example of a mobile communication system.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system.

Although the following description will be based on the 3GPP LTE system and the 3GPP LTE-A system to clarify description, it is to be understood that technical spirits of the present invention are not limited to the 3GPP LTE and the 3GPP LTE-A system.

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
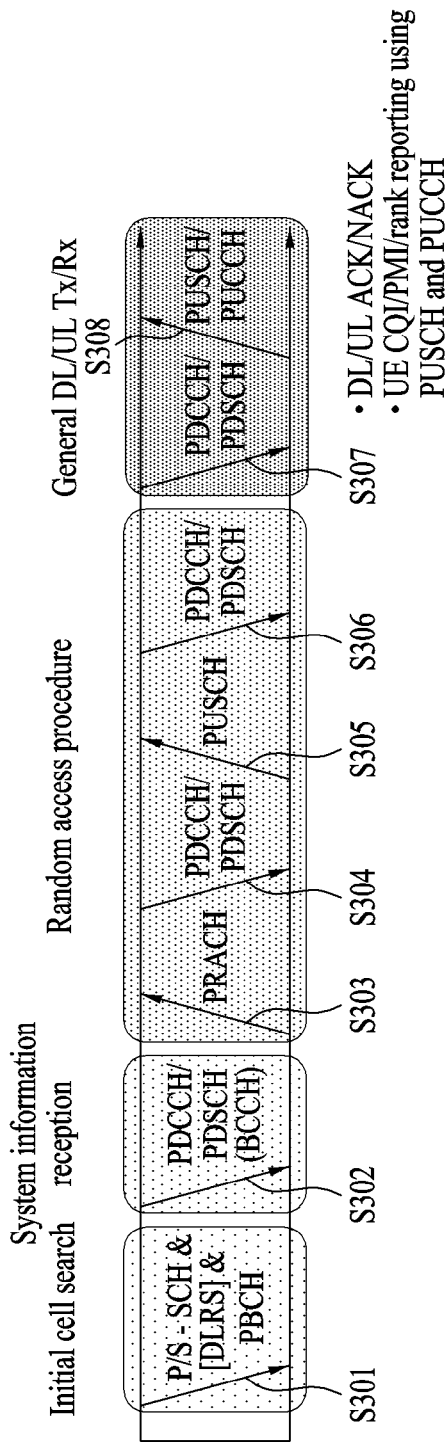
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

Thereafter, the UE may perform a random access procedure such as steps S303 to S306 to complete the access to the base station. To this end, the UE may transmit a preamble through a physical random access channel (PRACH) (S303) and may receive a response message to the preamble through the PDCCH and the PDSCH corresponding to the PDCCH (S304). In case of a contention based random access, the UE may perform a contention resolution procedure such as transmission (S305) of additional PRACH and reception (S306) of the PDCCH and the PDSCH corresponding to the PDCCH.

After performing the above-described procedures, the user equipment may receive a Physical Downlink Control Channel (PDCCH)/Physical Downlink Shared Channel (PDSCH) (S307), as a general uplink/downlink signal transmission procedure, and may then perform Physical Uplink Shared Channel (PUSCH)/Physical Uplink Control Channel (PUCCH) transmission (S308). The control information being transmitted by the user equipment to the base station is collectively referred to as Uplink Control Information (UCI). The UCI includes HARQ ACK/NACK (Hybrid Automatic Repeat and reQuest Acknowledgement/Negative-ACK), SR (Scheduling Request), CSI (Channel State Information), and so on. In the description of the present invention, the HARQ ACK/NACK will simply be referred to as HARQ-ACK or ACK/NACK (A/N). Herein, the HARQ-ACK includes at least one of a positive ACK (simply referred to as ACK), a negative ACK (simply referred to as NACK), a DTX, and an NACK/DTX. The CSI includes CQI (Channel Quality Indicator), PMI (Precoding Matrix Indicator), RI (Rank Indication), and so on. The UCI is generally transmitted through the PUCCH. However, when control information and traffic data are to be transmitted at the same time, the UCI may also be transmitted through the PUSCH.

Additionally, based upon a network request/indication, the UCI may be aperiodically transmitted through the PUSCH.

Figure 4:
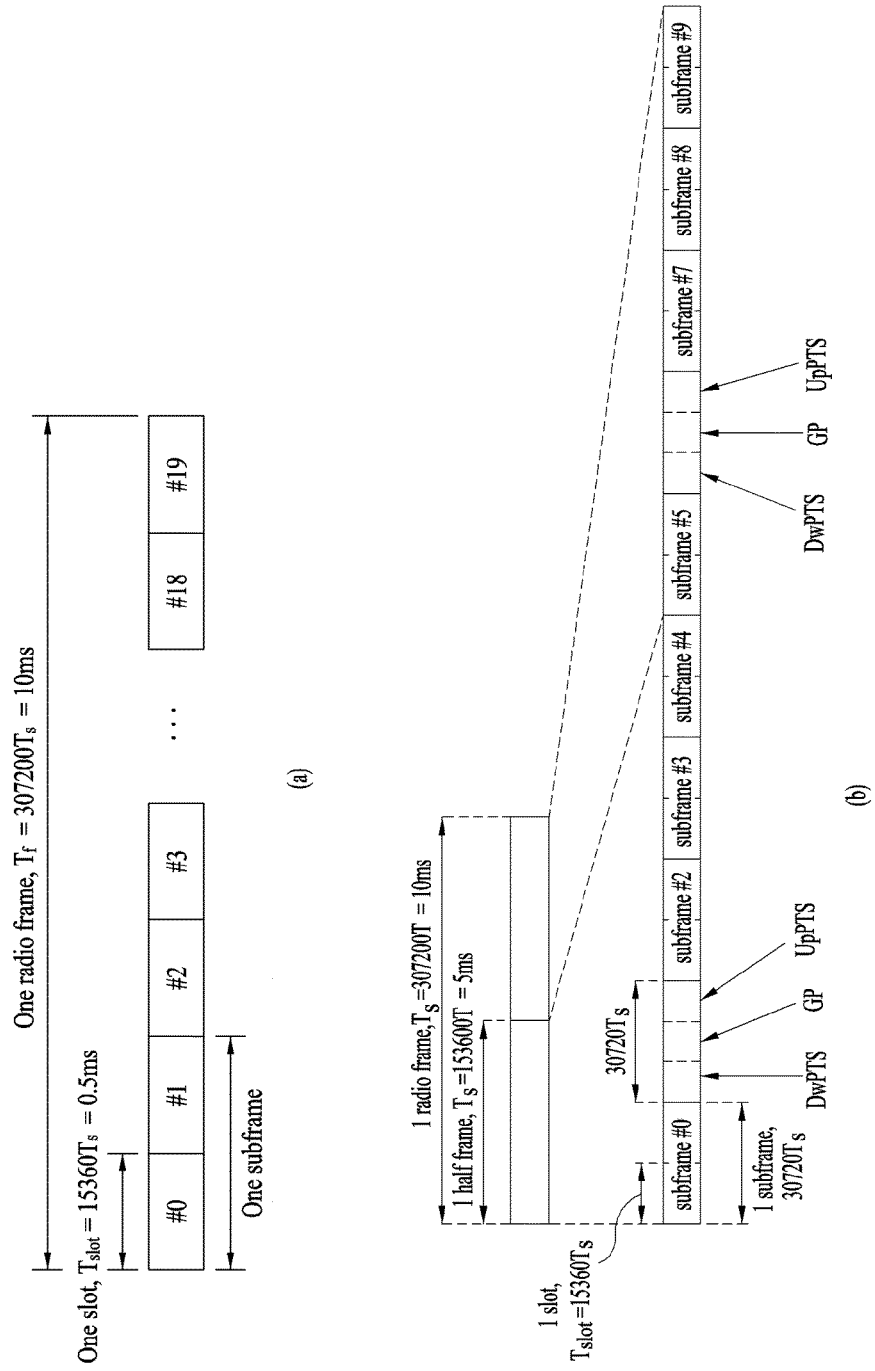
FIG. 4 illustrates exemplary radio frame structures in a LTE system.

FIG. 4 illustrates exemplary radio frame structures in a LTE system.

Referring to FIG. 4, in a cellular OFDM wireless packet communication system, an uplink/downlink data packet is transmitted on a eme basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 4(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 4(b) illustrates the type-2 radio frame structure. The type-2 radio frame includes two half frames each having 4 normal subframes and a special subframe including a downlink pilot time slot (DwPTS), a guard period (GP), and an uplink pilot time slot (UpPTS). Each normal subframe includes two slots.

In the special subframe, the DwPTS is used for initial cell search, synchronization, or channel estimation in a UE. The UpPTS is used for channel estimation in an eNB and uplink transmission synchronization in a UE. Thus, the DwPTS is used for downlink transmission and the UpPTS is used for uplink transmission. Especially, the UpPTS is used for transmission of a PRACH preamble or SRS. The GP is a period between a downlink and an uplink, for eliminating interference with the uplink caused by multi-path delay of a downlink signal.

In the current 3GPP standard document, the configuration of a special subframe is defined as shown below in Table 1. In Table 1, when $T_s=1/(15000\times 2048)$, this indicates DwPTS and UpPTS, and the remaining area is set up as the guard period.

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Meanwhile, in a Type 2 radio frame structure, more specifically, in a TDD system, an uplink/downlink subframe configuration (UL/DL configuration) is as shown below in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a downlink subframe, U indicates an uplink subframe, and S represents the special subframe.

Additionally, in Table 2, downlink-uplink switching periodicity in the uplink/downlink subframe configuration of each system.

The aforementioned radio frame structure is purely exemplary and thus the number of subframes included in a radio frame, the number of slots included in a subframe, or the number of symbols included in a slot may vary.

Figure 5:
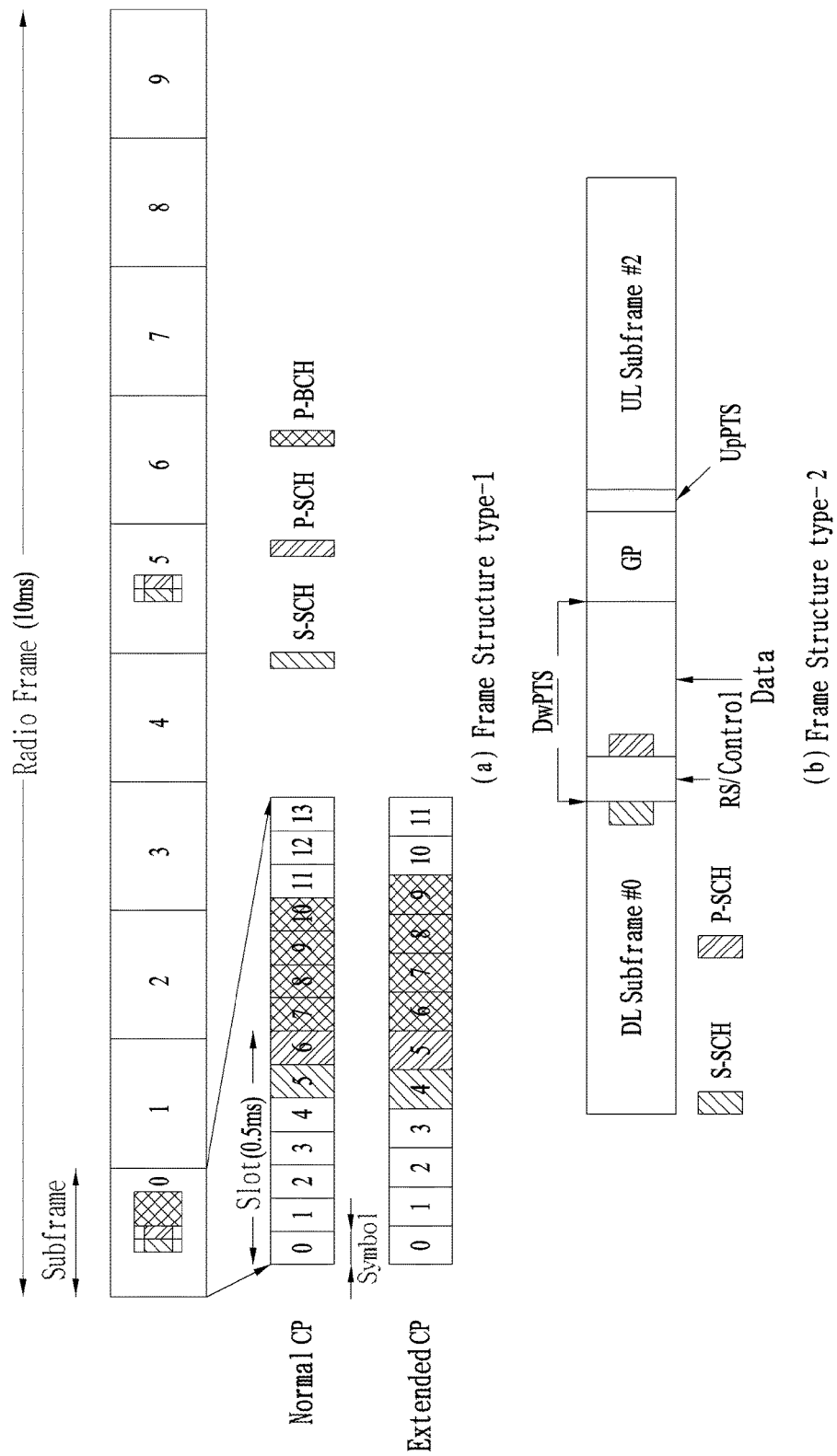
FIG. 5 illustrates a primary broadcast channel (P-BCH) and a synchronization channel (SCH)

FIG. 5 illustrates a primary broadcast channel (P-BCH) and a synchronization channel (SCH). The SCH includes a primary synchronization channel (P-SCH) and a secondary synchronization channel (S-SCH). A primary synchronization signal (PSS) is transmitted on the P-SCH and a secondary synchronization signal (SSS) is transmitted on the S-SCH.

Referring to FIG. 5, in the frame structure type-1 (i.e., FDD), the P-SCH is located at a last OFDM symbol in each of slot #0 (i.e., a first slot of subframe #0) and slot #10 (i.e., a first slot of subframe #5) per radio frame. The S-SCH is located at a previous OFDM symbol before the last OFDM symbol in each of slot #0 and slot #10 per radio frame. The S-SCH and the P-SCH are located at neighboring OFDM symbols. In the frame structure type-2 (i.e., TDD), the P-SCH is transmitted through a third OFDM symbol in each of subframes #1 and #6. And, the S-SCH is located at a last OFDM symbol in each of slot #1 (i.e., a second slot of subframe #0) and slot #11 (i.e., a second slot of subframe #5). The P-BCH is transmitted in every four radio frames irrespective of the frame structure type. And, the P-BCH is transmitted using the first to fourth OFDM symbols in the second slot of the subframe #0.

The P-SCH is transmitted using 72 subcarriers (10 subcarriers are reserved and 62 subcarriers are used for PSS transmission) based on a DC (direct current) subcarrier in a corresponding OFDM symbol. The S-SCH is transmitted using 72 subcarriers (10 subcarriers are reserved and 62 subcarriers are used for SSS transmission) based on a DC subcarrier in a corresponding OFDM symbol. The P-BCH is mapped to 72 subcarriers based on a DC subcarrier and four OFDM symbols in one subframe.

Figure 6:
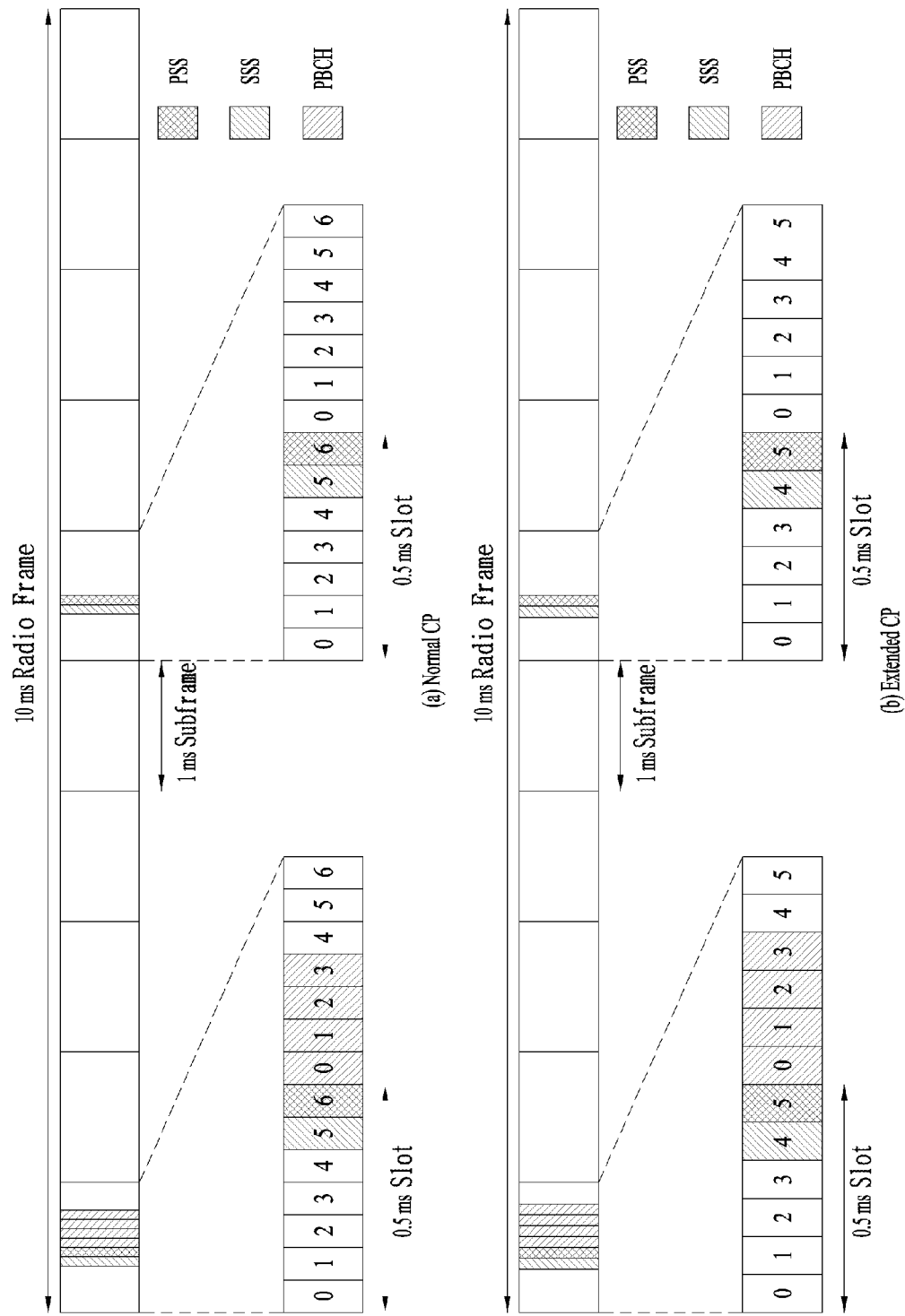
FIG. 6 illustrates a radio frame structure for transmission of a synchronization signal (SS)

FIG. 6 illustrates a radio frame structure for transmission of a synchronization signal (SS). Especially, FIG. 6 illustrates a radio frame structure for transmission of an SS and a PBCH in frequency division duplex (FDD), wherein FIG. 6(a) illustrates transmission locations of an SS and a PBCH in a radio frame configured with a normal cyclic prefix (CP) and FIG. 6(b) illustrates transmission locations of an SS and a PBCH in a radio frame configured with an extended CP.

If a UE is powered on or newly enters a cell, the UE performs an initial cell search procedure for obtaining time and frequency synchronization with the cell and detecting a physical cell identity of the cell. To this end, the UE may match synchronization with an eNB by receiving synchronization signals, e.g. a primary synchronization signal (PSS) and a secondary synchronization signal (SSS), from the eNB and then obtain information such as a cell identity (ID) and the like.

An SS will be described in more detail with reference to FIG. 6. An SS is categorized into a PSS and an SSS. The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 6, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard. In other words, a single antenna port transmission scheme or a transmission scheme transparent to a UE (e.g. precoding vector switching (PVS), time switched transmit diversity (TSTD), or cyclic delay diversity (CDD)) can be adopted for transmission diversity of the SS.

The SS can represent total 504 unique physical layer cell IDs through combinations of 3 PSSs and 168 SSSs. In other words, the physical layer cell IDs are grouped into 168 physical layer cell ID groups each including three unique IDs so that each physical layer cell ID is a part of only one physical layer cell ID group. Thus, a physical layer cell ID $N^{cell}_{ID}$ is uniquely defined with a number $N^{(1)}_{ID}$ in the range of 0 to 167 indicating a physical layer cell ID group and a number $N^{(2)}_{ID}$ from 0 to 2 indicating a physical layer ID in the physical layer cell ID group (i.e., $N^{cell}_{ID}=3N^{(1)}_{ID}+N^{(2)}_{ID}$). A UE can obtain one of the three unique physical layer IDs by detecting the PSS and then identify one, which is associated with the physical layer ID, among the 168 physical layer cell IDs in a manner of detecting the SSS. A Zadoff-Chu (ZC) sequence of a length of 63 is defined in a frequency domain and the sequence is used as the PSS. For example, the ZC sequence can be defined according to Equation 1 below.

$$d_u(n) = e^{-j\frac{\pi u n(n+1)}{N_{ZC}}} \qquad \text{[Equation 1]}$$

In Equation 1, $N_{ZC}=63$ and a sequence element corresponding to a DC subcarrier, n=31, is punctured.

The PSS is mapped to 6 RBs (=72 subcarriers) adjacent to a center frequency. Among the 72 subcarriers, 9 remaining subcarriers carry a value of 0 at all times and serve as elements facilitating filter design for performing synchronization. In order to define total three PSSs, u=24, u=29, and u=34 are used in Equation 1. Since u=24 and u=34 have a conjugate symmetry relation, two correlations may be simultaneously performed. In this case, the conjugate symmetry means the relationship in Equation 2 below.

$$d_u(n)=(-1)^n(d_{N_{ZC}-u}(n))^*, \text{ when } N_{ZC} \text{ is even number}$$

$$d_u(n)=(d_{N_{ZC}-u}(n))^*, \text{ when } N_{ZC} \text{ is odd number} \qquad \text{[Equation 2]}$$

A one-shot correlator for u=29 and u=34 can be implemented using conjugate symmetry characteristics. Moreover, compared to a case without the conjugate symmetry, the total amount of calculation can be reduced by about 33.3%.

In more detail, a sequence d(n) used for the PSS can be generated from a frequency-domain ZC sequence according to Equation 3 below.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 3]}$$

In Equation 3, a ZC root sequence index u can be given according to Table 3 below.

TABLE 3

| $N^{(2)}_{ID}$ | Root index u |
|---|---|
| 0 | 25 |
| 1 | 29 |
| 2 | 34 |

Referring to FIG. 6, by detecting the PSS, a UE may know that a corresponding subframe is one of subframe 0 and subframe 5 since the PSS is transmitted every 5 ms but the UE cannot know whether the subframe is subframe 0 or subframe 5. In other words, the UE cannot recognize boundaries of a radio frame only through the PSS. That is, frame synchronization cannot be obtained only from the PSS. The UE detects the boundaries of the radio frame in a manner of detecting an SSS which is transmitted twice in one radio frame with different sequences.

Figure 7:
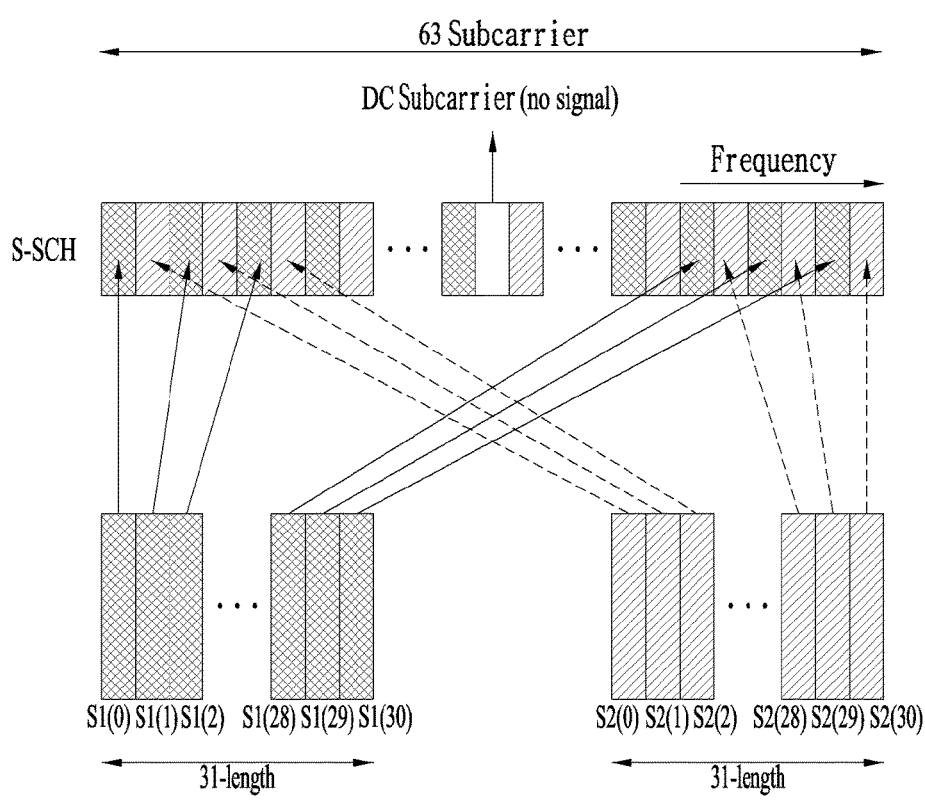
FIG. 7 is a diagram for explaining a scheme of generating a secondary synchronization signal (SSS)

FIG. 7 is a diagram for explaining a scheme of generating a secondary synchronization signal (SSS). In particular, FIG. 7 illustrates a mapping relation of two sequences between a logical domain and a physical domain.

A sequence used for the SSS corresponds to an interleaved concatenation of two m-sequences each of a length of 31. The concatenated sequence is scrambled by a scrambling sequence given by the PSS. In this case, the m-sequence is a kind of a pseudo noise (PN) sequence.

Referring to FIG. 7, if two m-sequences used for generating an SSS code are denoted by S1 and S2 respectively, then two different PSS-based sequences S1 and S2 are scrambled into the SSS. In this case, S1 and S2 are scrambled by different sequences. A PSS-based scrambling code may be obtained by cyclically shifting an m-sequence generated from a polynomial of $x^5+x^3+1$. Depending on a PSS index, 6 sequences are generated by the cyclic shift of the m-sequence. Subsequently, S2 is scrambled by an S1-based scrambling code. The S1-based scrambling code may be obtained by cyclically shifting an m-sequence generated from a polynomial of $x^5+x^4+x^2+x^1+1$. Depending on an S1 index, 8 sequences are generated by the cyclic shift of the m-sequence. The SSS code is swapped every 5 ms, whereas the PSS-based scrambling code is not swapped. For example, assuming that an SSS of subframe 0 carries a cell group ID through a combination of (S1, S2), an SSS of subframe 5 carries a sequence swapped as (S2, S1). Thus, boundaries of a radio frame of 10 ms can be discerned. The SSS code used in this case is generated based on a polynomial of $x^5+x^2+1$. And, total 31 codes can be generated through different cyclic shifts of an m-sequence of length 31.

A combination of two m-sequences, each of which has length 31, used for defining the SSS differs in subframe 0 and subframe 5. Total 168 cell group IDs are represented according to a combination of the two m-sequences each of length 31. The m-sequences used as sequences for the SSS have a robust property in a frequency selective environment. In addition, since the m-sequences can be transformed by high-speed m-sequence transform that uses fast Hadamard transform, if the m-sequences are utilized for the SSS, the amount of calculation necessary for a UE to interpret the SSS can be reduced. Moreover, since the SSS is composed of two short codes, the amount of calculation of the UE can also be reduced.

Generation of the SSS is described in more detail. Sequences of d(0), ..., d(61) used for the SSS are an interleaved concatenation of two binary sequences, each of which has length 31. The concatenated sequence is scrambled by a sequence given by the PSS.

A combination of two sequences, each of which has length 31, used for defining the PSS can be different in subframe 0 and subframe 5 according to Equation 4.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 4]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Equation 4, $0 \leq n \leq 30$. Indices $m_0$ and $m_1$ are derived from the physical layer cell identity group $N^{(1)}_{ID}$ according to Equation 5.

$$m_0 = m' \bmod 31 \quad \text{[Equation 5]}$$
$$m_1 = (m_0 + \lfloor m'/31 \rfloor + 1) \bmod 31$$
$$m' = N^{(1)}_{ID} + q(q+1)/2,$$
$$q = \left\lfloor \frac{N^{(1)}_{ID} + q'(q'+1)/2}{30} \right\rfloor, q' = \lfloor N^{(1)}_{ID}/30 \rfloor$$

The output in Equation 5 will be listed in Table 4 after Equation 11.

Two sequences $S^{(m0)0}(n)$ and $S^{(m1)1}(n)$ are defined as two different cyclic shifts of an m-sequence s(n) according to Equation 6.

$$s_0^{(m0)}(n) = s((n+m_0) \bmod 31)$$
$$s_1^{(m1)}(n) = s((n+m_1) \bmod 31) \quad \text{[Equation 6]}$$

Equation 6, s(i)=1−2x(i) (where $0 \leq i \leq 30$) is defined according to Equation 7 with initial conditions x(0)=0, x(1)=0, x(2), x(3)=0, and x(4)=1.

$$x(\bar{i}+5) = (x(\bar{i}+3)+x(\bar{i})) \bmod 2, \, 0 \leq \bar{i} \leq 25$$

Two scrambling sequences $c_0(n)$ and $c_1(n)$ depend on the PSS and are defined by two different cyclic shifts of an m-sequence c(n) according to Equation 8.

$$c_0(n) = c((n+N_{ID}^{(2)}) \bmod 31)$$
$$c_1(n) = c((n+N_{ID}^{(2)}+3) \bmod 31) \quad \text{[Equation 8]}$$

In Equation 8, $N^{(2)}_{ID} \in \{0, 1, 2\}$ is a physical layer identity in the physical layer cell identity group $N^{(1)}_{ID}$ and c(i)=1−2x(i) (where $0 \leq i \leq 30$) is defined according to Equation 9 with initial conditions x(0)=0, x(1)=0, x(2), x(3)=0, and x(4)=1.

$$x(\bar{i}+5) = (x(\bar{i}+3)+x(\bar{i})) \bmod 2, \, 0 \leq \bar{i} \leq 25 \quad \text{[Equation 9]}$$

Scrambling sequences $Z^{(m0)1}(n)$ and $Z^{(m1)1}(n)$ are defined by cyclic shifts of an m-sequence z(n) according to Equation 10.

$$Z_1^{(m0)}(n) = z((n+(m_0 \bmod 8)) \bmod 31)$$

$$Z_1^{(m1)}(n) = z((n+(m_1 \bmod 8)) \bmod 31) \quad \text{[Equation 10]}$$

Equation 10, $m_0$ and $m_1$ are obtained from Table 4 after Equation 11 and $z(i)=1-2x(i)$ (where $0 \leq i \leq 30$) is defined according to Equation 11 with initial conditions $x(0)=0$, $x(1)=0$, $x(2)$, $x(3)=0$, and $x(4)=1$.

$$x(\bar{i}+5)=(x(\bar{i}+4)+x(\bar{i}+2)+x(\bar{i}+1)+x(\bar{i})) \bmod 2, \ 0 \leq \bar{i} \leq 25 \quad \text{[Equation 11]}$$

TABLE 4

| $N^{(1)}_{ID}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |

TABLE 4-continued

| $N^{(1)}_{ID}$ | $m_0$ | $m_1$ |
|---|---|---|
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |

TABLE 4-continued

| $N^{(1)}_{ID}$ | $m_0$ | $m_1$ |
|---|---|---|
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Having demodulated a DL signal by performing a cell search procedure using the SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters. The MIB includes most frequently transmitted parameters which are essential for a UE to initially access a network served by an eNB. The SIB1 includes not only information on time-domain scheduling for other SIBs but also parameters necessary to determine whether a specific cell is suitable in cell selection.

The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit CRC (cyclic redundancy check) used in detecting an error of the PBCH.

The PBCH is mapped to four subframes during 40 ms. The time of 40 ms is for blind detection and there is no explicit signaling for the time of 40 ms. In the time domain, the PBCH is transmitted in OFDM symbols 0 to 3 of slot 1 in subframe 0 (i.e., the second slot of subframe 0) of a radio frame.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having accessed the network served by the eNB after completing the initial cell search, the UE is able to obtain more detailed system information by receiving PDCCH and PDSCH according to information carried on the PDCCH. After performing the above-described procedure, the UE may perform PDCCH/PDSCH reception and PUSCH/PUCCH transmission as a general UL/DL signal transmission procedure.

Figure 8:
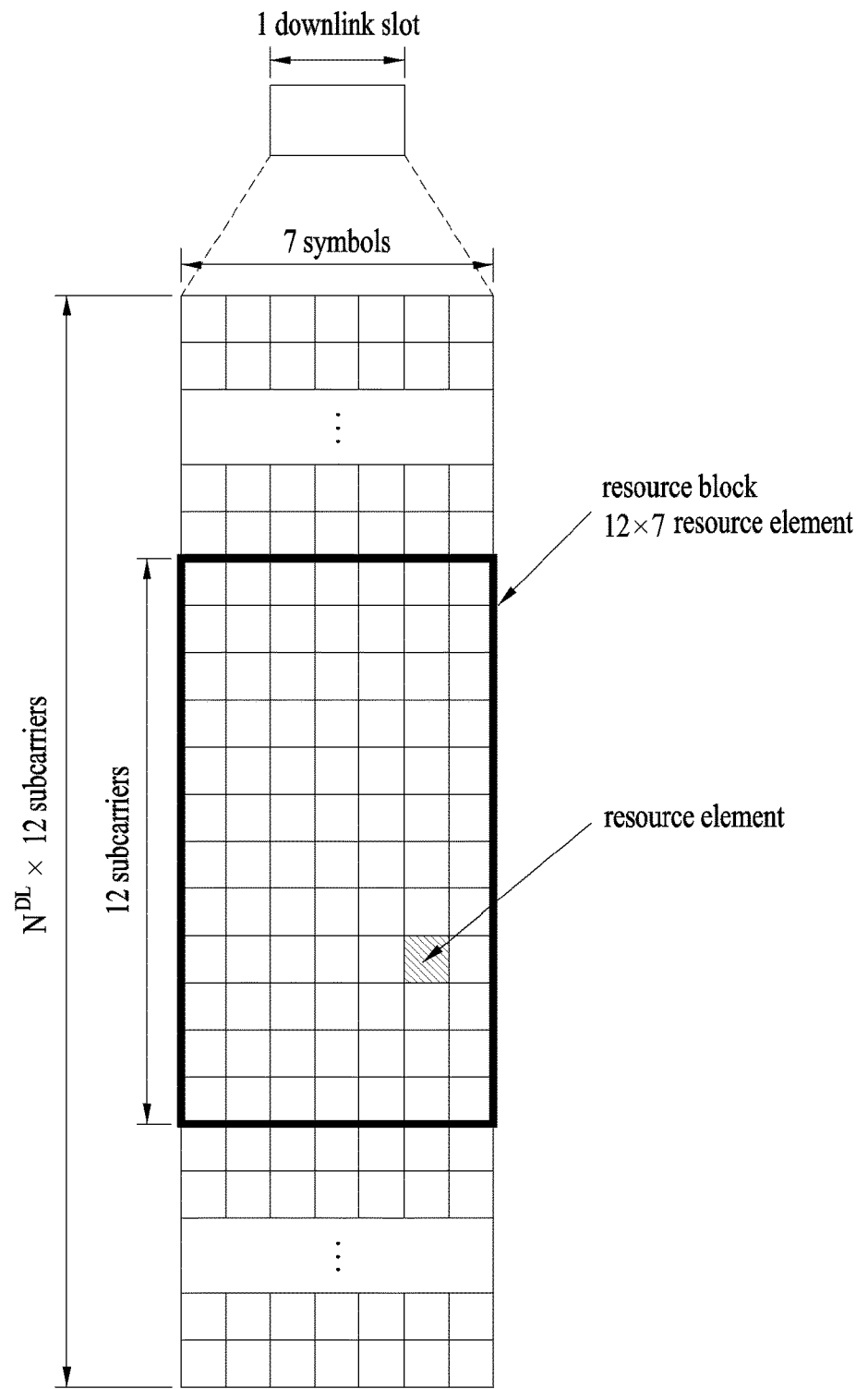
FIG. 8 is a diagram showing a resource grid for a downlink slot.

FIG. 8 illustrates a resource grid for a downlink slot.

Referring to FIG. 8, a downlink slot includes $N_{symb}^{DL}$ OFDM symbols in a time domain and $N_{RB}^{DL}$ resource blocks in a frequency domain. Since each resource block includes $N_{SC}^{RB}$ subcarriers, the downlink slot includes $N_{RB}^{DL} \times N_{SC}^{RB}$ subcarriers in the frequency domain. Although FIG. 8 illustrates that the downlink slot includes 7 OFDM symbols and the resource block includes 12 subcarriers, it is to be understood that the present invention is not limited thereto. For example, the number of OFDM symbols included in the downlink slot may be changed depending on a length of CP (cyclic prefix).

Each element on a resource grid is referred to as a resource element (RE). One resource element is indicated by one OFDM symbol index and one subcarrier index. One RB includes $N_{symb}^{DL} \times N_{SC}^{RB}$ resource elements. The number $N_{RB}^{DL}$ of resource blocks included in the downlink slot depends on a downlink transmission bandwidth configured in a cell.

Figure 9:
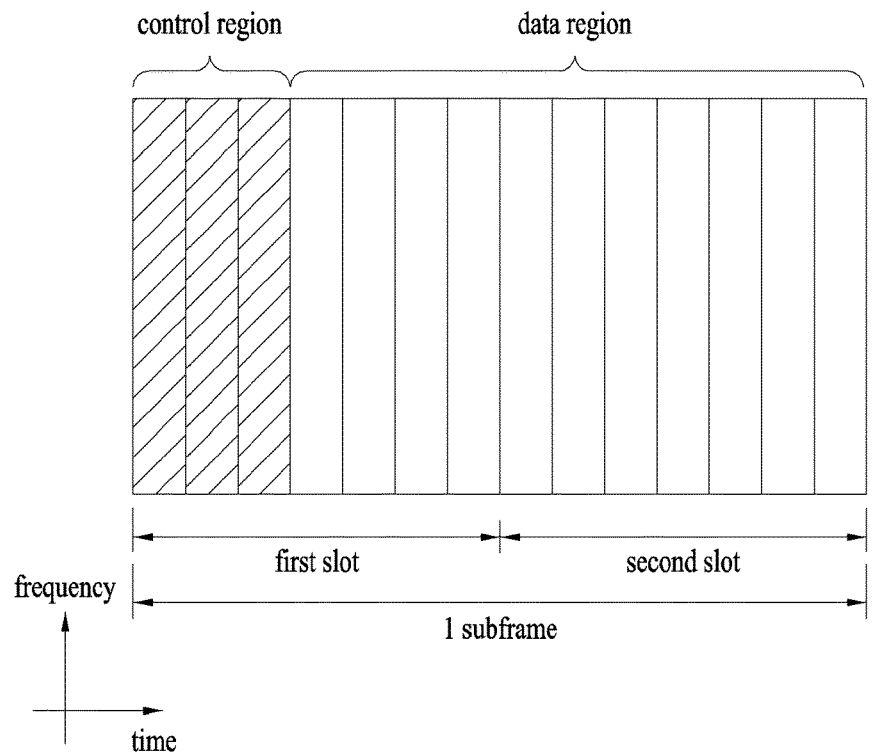
FIG. 9 illustrates an example of a downlink subframe structure.

FIG. 9 illustrates a downlink subframe structure.

Referring to FIG. 9, up to three (or four) OFDM symbols at the start of the first slot in a downlink subframe are used for a control region to which control channels are allocated and the other OFDM symbols of the downlink subframe are used for a data region to which a PDSCH is allocated. Downlink control channels used in LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission.

Control information carried on the PDCCH is called downlink control information (DCI). The DCI includes uplink resource allocation information and other control information for an UE or an UE group. For example, the DCI includes downlink/uplink scheduling information, an uplink transmit (Tx) power control command, and etc.

The PDCCH carries transmission format and resource allocation information of a downlink shared channel (DL-SCH), transmission format and resource allocation information of an uplink shared channel (UL-SCH), paging information on a paging channel (PCH), system information on the DL-SCH, resource allocation information of an upper layer control message such as a random access response transmitted on the PDSCH, a set of Tx power control commands for individual UEs in a UE group, Tx power control command, activity indication information of voice over Internet protocol (VoIP), and the like. A plurality of PDCCHs can be transmitted in the control region. The UE is able to monitor a plurality of the PDCCHs. The PDCCH is transmitted on aggregation of one or a plurality of consecutive control channel elements (CCEs). The CCE is a logic allocation unit used to provide the PDCCH with a coding rate based on a radio channel state. The CCE corresponds to a plurality of resource element groups (REGs). The format of the PDCCH and the number of bits of the PDCCH are determined according to the number of CCEs. An eNB determines the PDCCH format according to the DCI to be transmitted to a UE and attaches cyclic redundancy check (CRC) to the control information. The CRC is masked with an identifier (e.g., radio network temporary identifier (RNTI)) depending on usage of the PDCCH or an owner of the PDCCH. For instance, if the PDCCH is for a specific UE, the CRC may be masked with an identifier (e.g., cell-RNTI (C-RNTI)) of the corresponding UE. If the PDCCH is for a paging message, the CRC may be masked with a paging identifier (e.g., paging-RNTI (P-RNTI)). If the PDCCH is for system information (more particularly, system information block (SIB)), the CRC may be masked with a system information RNTI (SI-RNTI). If the PDCCH is for a random access response, the CRC may be masked with a random access RNTI (RA-RNTI).

Figure 10:
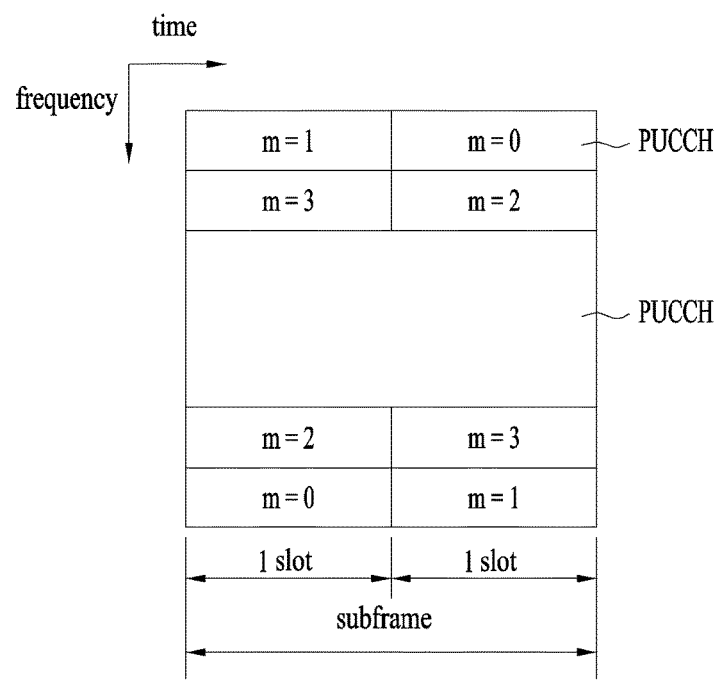
FIG. 10 is a diagram showing a structure of an uplink subframe used in LTE.

FIG. 10 illustrates a structure of an uplink subframe used in LTE.

Referring to FIG. 10, an uplink subframe includes a plurality (e.g., 2) of slots. The number of SC-FDMA symbols included in the slot may vary depending on the CP length. The uplink subframe is divided into a control region and a data region in a frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH can be used to transmit the following control information.
SR (scheduling request): Information used to request UL-SCH resources. This is transmitted using an on-off keying (OOK) scheme.
HARQ ACK/NACK: Response signal with respect to a downlink data packet on PDSCH. This indicates whether the downlink data packet is successfully received. 1-bit ACK/NACK is transmitted in response to a single downlink codeword and 2-bit ACK/NACK is transmitted in response to two downlink codewords.
CSI (channel state information): Feedback information with respect to a downlink channel. The CSI includes a channel quality indicator (CQI) and MIMO-related (multiple input multiple output) feedback information includes a rank indicator (RI), a precoding matrix indicator (PMI) and a precoding type indicator (PTI). 20 bits are used in each subframe.

The amount of UCI that can be transmitted in a subframe by a UE depends on the number of SC-FDMA symbols available for control information transmission. The SC-FDMA symbols available for control information transmission mean the remaining SC-FDMA symbols except SC-FDMA symbols for reference signal transmission in a subframe. In case of a subframe having a sounding reference signal (SRS) configured therein, a last SC-FDMA symbol of the subframe is also excluded. The reference signal is used for coherent detection of the PUCCH.

When D2D communication is introduced in the aforementioned wireless communication system (e.g., 3GPP LTE system or 3GPP LTE-A system), specific methods for performing the D2D communication are described hereinafter.

Figure 11:
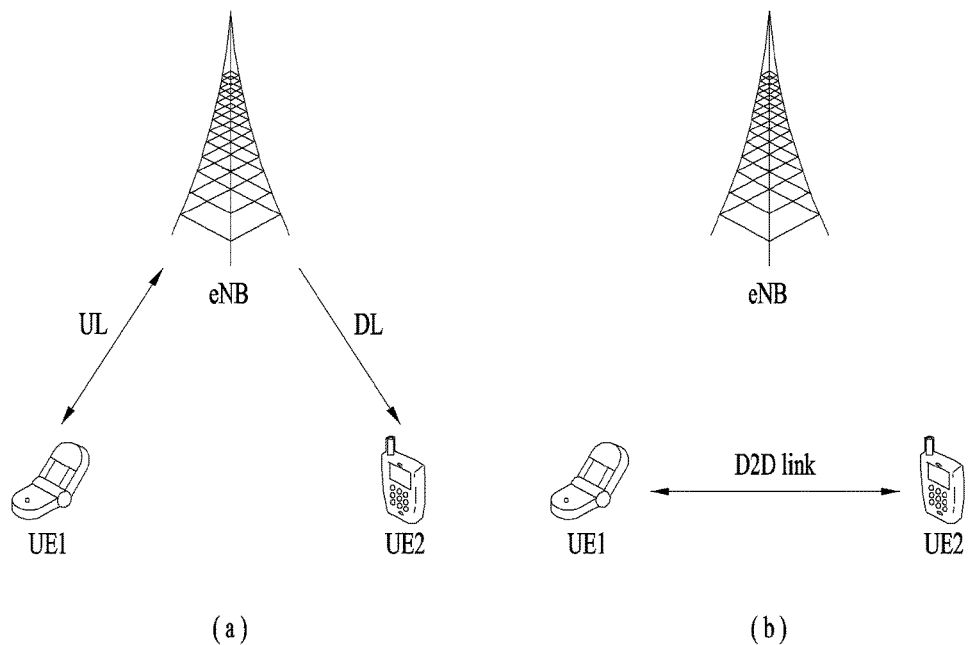
FIG. 11 illustrates D2D communication.

FIG. 11 is a conceptual diagram for explaining D2D communication. FIG. 11 (a) shows a conventional eNB-based communication scheme. According to the conventional eNB-based communication scheme in FIG. 11 (a), a first UE (UE1) can transmit data to an eNB in uplink and the eNB can forward data transmitted from the first UE (UE1) to a second UE (UE2) in downlink.

FIG. 11 (b) shows a UE-to-UE communication scheme as an example of D2D communication. According to the UE-to-UE communication scheme in FIG. 11 (b), data exchange between UEs can be performed without intervention of the eNB. A link directly established between such devices can be called a D2D link. Compared to the conventional eNB-based communication scheme, the D2D communication has advantages in that latency is reduced and a small amount of resources is required.

Although the D2D communication corresponds to a scheme for supporting device-to-device (or UE-to-UE) communication without intervention of the eNB, the D2D communication should not cause interference or disturbance to a conventional wireless communication system (e.g., 3GPP LTE/LTE-A) since it is performed in a manner of reusing resources in the conventional wireless communication system. In this context, it is also important to minimize interference caused to the D2D communication by a UE or an eNB operating in the conventional wireless communication system.

When UEs supporting D2D communication perform synchronization between the UEs, the present invention proposes to use sequences differently arranged according to an OFDM symbol. In particular, there exist sequence ID sets different from each other according to a position of the OFDM symbol. A D2D reception UE performs blind detection on the sequence ID sets and detects synchronization.

In LTE-A, cellular communication uses a primary synchronization signal (PSS) and a secondary synchronization signal (SSS) as a synchronization signal. The PSS consists of a ZC (Zadoff-Chu) sequence of a length of 63 (including a DC-punctured part) and includes a root set of {25, 29, 34}. In particular, the PSS selects a sequence type from among three sequence types and uses the selected sequence type. Meanwhile, the SSS is determined by M-sequence including a root set of {0, . . . , 167}. The SSS generates and uses a sequence of a length of 62 by using the PSS root together. Meanwhile, a D2DSS is referred to as a PD2DSS (primary D2D synchronization signal) or an SD2DSS (secondary D2D synchronization signal). The PD2DSS and the SD2DSS can be defined by the ZC sequence and the M-sequence, respectively.

In the cellular communication, since a device for transmitting such a synchronization signal as the PSS and the SSS is fixed by an eNB and the synchronization signal is transmitted with a short interval (e.g., 5 ms), although a synchronization signal is missed once, it is able to detect a next synchronization signal. On the contrary, in the D2D communication, since each of a plurality of UEs transmits a synchronization signal, it is necessary to transmit the synchronization signal with a relative long interval (e.g., dozens of ms~hundreds of ms) to efficiently utilize a resource. In particular, since it is necessary to detect synchronization signals as many as possible with the restricted count of transmission, it may be preferable to transmit a synchronization signal in a manner of loading the synchronization signal on many symbols at a time. In the following description of the present invention, for clarity, assume that a synchronization signal occupies many symbols in a subframe.

And, in the present invention, assume that a PD2DSS uses a ZC sequence of a length L. If the L corresponds to a prime number, it is able to use a root index including up to maximum {0, 1, . . . , L−2}. Hence, it may be preferable to determine the L by a prime number. For example, if the L corresponds to 61, it is able to use 60 root indexes including {0, 1, . . . , 59}.

Hence, in the present invention, assume that the L corresponds to 61 for clarity. And, assume that a sequence is generated using an ID set {0, 1, . . . , N−1}. In this case, it is not mandatory that the N−1 corresponds to 59. The N−1 may become a random number equal to or less than 59. And, although a value selected from the ID set and a root index value used for practically generating a sequence are identical to each other, the values are different from each other in general. For example, in case of a PSS of LTE-A, although an ID set corresponds to {0, 1, 2}, a PSS root set corresponds to {25, 29, 34}. In particular, a relation between a single ID value and a root index corresponds to one-to-one (1:1) relation. Moreover, for clarity, an ID set (e.g., an ID set A) is disclosed in the present invention, the ID set may indicate a sequence (i.e., a sequence based on an ID set A) which is generate based on a specific ID set.

And, in a D2D synchronization signal, a usable ID set may vary according to a symbol. An ID set is sequentially detected in a manner of being divided into a plurality of ID sets of a (relatively) small size instead of using a single ID set. By doing so, it may be able to reduce complexity of blind detection and an error of detecting a wrong timing. Moreover, according to the present invention, the very last symbol (e.g., in case of a normal CP, an OFDM symbol index #13) corresponds to a transition symbol. The transition symbol is used to avoid interference with a following WAN subframe. Assume that the transition symbol is located at the very last symbol in the present invention. Yet, the present invention can be identically applied although the transition symbol is located at the very first symbol.

Figure 12:
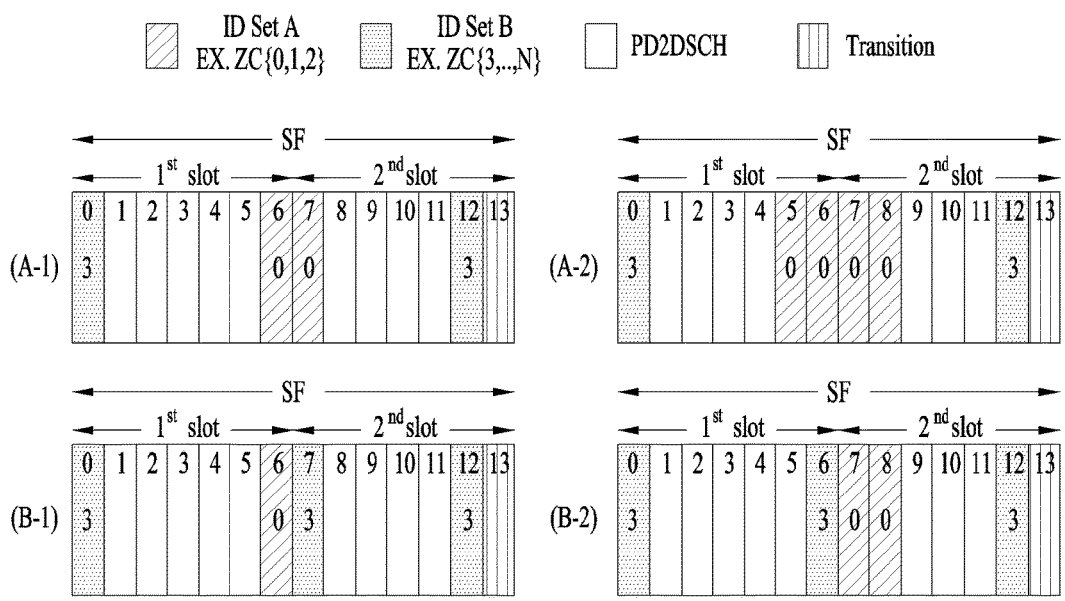
FIG. 12 is a diagram for explaining an embodiment of arranging ID sets of which a transition symbol according to the present invention is located at the end of a subframe.

FIG. 12 is a diagram for explaining an embodiment of arranging ID sets of which a transition symbol according to the present invention is located at the end of a subframe.

Referring to FIG. 12, as shown in A-1, an ID is selected from an ID set A {0, 1, 2} and the selected ID is used at a center slot boundary of a subframe. An ID is selected from an ID set B {3, 4, 5, . . . , N−1} and the selected ID can be used at two D2DSS symbols located at opposite ends.

In the following description, a D2D reception UE performs blind detection according to time on the basis of the ID set A and may be then able to detect a symbol and a subframe boundary (or a slot boundary). The D2D reception UE performs blind detection on the ID set B based on a location of the detected subframe boundary and may be then able to more precisely perform symbol/subframe detection, frequency error estimation, channel estimation and the like. In particular, compared to a case of selecting an ID from a super set {0, 1, . . . , N−1} and transmitting the selected ID, complexity is reduced to 3/N and an error of confusing symbols at opposite ends with inside symbols is considerably reduced.

In this case, since blind detection is performed all the time, it is preferable to make a size of the ID set to be relatively small. On the contrary, since a size of the ID set B is detected based on a location (near of the location) of a symbol estimated from the ID set A, calculation complexity is considerably smaller. And, if there exist relatively many types of sequences, when a signal transmitted by a different UE is detected, the signal can be recognized as noise. By doing so, it is able to more precisely detect timing or more properly estimate a frequency and a channel. Hence, it is preferable to make a size of the ID set B to be relatively big. Meanwhile, the rest of symbols can be used as PD2DSCH for information necessary for performing D2D communication. If an RS for performing channel estimation is separately required, the rest of symbols can be used as a D2D-DMRS.

Hence, (A-2) of FIG. 12 shows a case of increasing the number of symbols of the ID set A to 4 based on the (A-1) of FIG. 12 to enhance synchronization detection performance. In this case, the symbols of the ID set A are not necessarily to be located at the center of a subframe (e.g., OFDM symbol index #6, 7, 8 and 9). Yet, if the symbols of the ID set A include a slot boundary symbol (e.g., OFDM symbol index #6 or #7), it is advantageous for detecting a slot boundary. And, if the symbols of the ID set A are located at contiguous symbols, it is advantageous for deriving a CP length from a difference between a length of a normal CP and a length of an extended CP.

Referring to FIG. 12 (a), symbols of the ID set B for estimating a channel are located at the opposite ends of a subframe at the center of the subframe. Hence, channel estimation performance may be incorrect at the center of the subframe. In order to supplement this, symbols of the ID set B are added to the center part of the subframe as shown in FIG. 12 (B-1) and (B-2).

Figure 13:
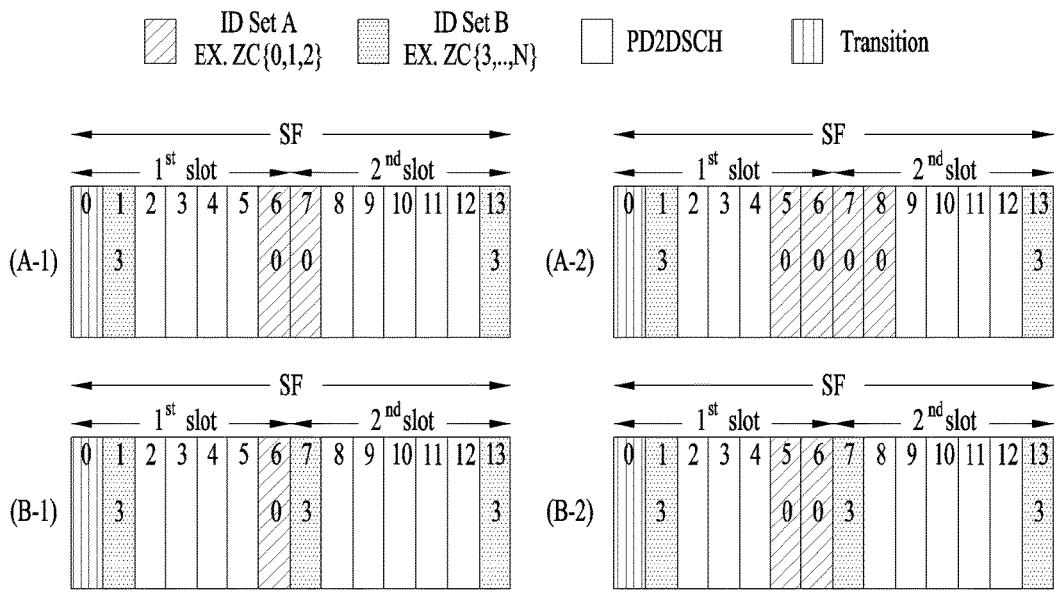
FIG. 13 is a diagram for explaining an embodiment of arranging ID sets of which a transition symbol according to the present invention is located at a first symbol of a subframe.

FIG. 13 is a diagram for explaining an embodiment of arranging an ID set that a transition symbol according to the present invention is located at a first symbol of a subframe. In the following description, arrangement if ID sets is identical to that of FIG. 12. Since it is advantageous to arrange an ID set B for estimating a channel with a same interval, FIG. 13 (B-2) shows a case that an ID set A is located at a symbol #5 and a symbol #6.

Meanwhile, when a D2D reception UE intends to receive a synchronization signal via a D2D subframe while performing a WAN operation, since an AGC (automatic gain control) block of the UE is configured in accordance with WAN signal strength, in order to make a value of the AGC block to be appropriate for D2D signal strength, a prescribed time is necessary. In particular, since first prescribed time of a D2D signal is used for setting an AGC value, a first symbol (OFDM symbol index #0) is unable to guarantee reception quality.

Hence, in FIGS. 12 to 13, if a symbol of the ID set B is located at a first available symbol (symbol #0 or #1), it becomes difficult to perform relevant channel estimation. In order to supplement this, two contiguous symbols can be used as the symbol of the ID set B at first.

Figure 14:
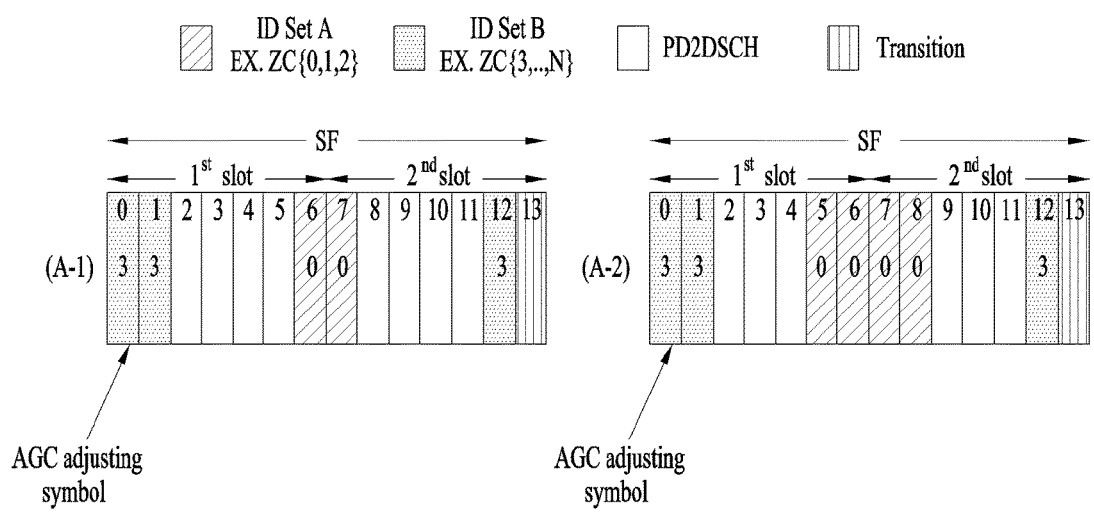
FIG. 14 is a diagram for explaining an ID set which is arranged in consideration of AGC tuning according to one embodiment of the present invention.

FIG. 14 is a diagram for explaining an ID set which is arranged in consideration of AGC tuning based on FIG. 12 (A). As shown in FIG. 14, symbols of the ID set B are continuously used in an OFDM symbol #0 and #1. In this case, assume that the OFDM symbol #0 is used for AGC tuning. Channel estimation is performed based on a synchronization signal of the OFDM symbol #1 (i.e., second OFDM symbol) (or, in consideration of the OFDM symbol #0 together). Although FIG. 14 shows an embodiment which is transformed based on FIG. 12 (A), if contiguous symbols are used as the symbols of the ID set B regarding the embodiments of FIG. 12 and FIG. 13, it should also be regarded as embodiments of the present invention.

In the aforementioned embodiments, it is assumed that a D2DSS symbol is repeated by an AGC symbol. Yet, the AGC symbol can be configured as a separate AGC sequence in consideration of PARR (or CM (cubic metric)) performance without repeating a following symbol.

Figure 15:
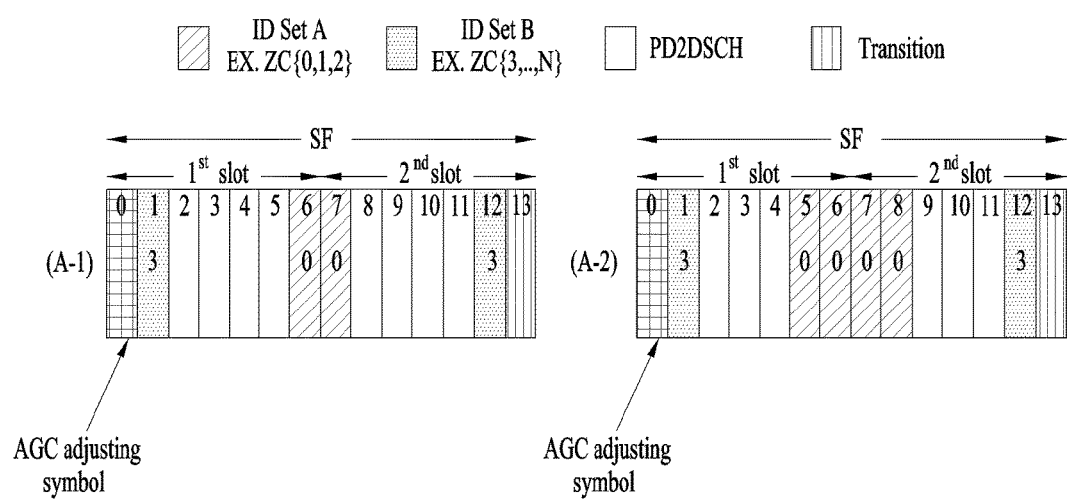
FIG. 15 is a diagram for explaining an AGC sequence made up of a plurality of short symbols stick together.

FIG. 15 is a diagram for explaining an AGC sequence made up of a plurality of short symbols stick together. In FIG. 15, the AGC sequence can be configured in a form that a plurality of short symbols are contiguously attached in a time axis. This is intended to make an AGC value to be configured by short symbols as many as necessary for implementing performance of a UE and make the rest of short symbols to be used for the usage of synchronization or channel estimation.

Examples of FIG. 12 and FIG. 13 are all depicted on the basis of a normal CP. FIG. E shows a case that a transition symbol is located at a subframe boundary on the basis of an extended CP (i.e., a case that a subframe is configured by 12 OFDM symbols).

Figure 16:
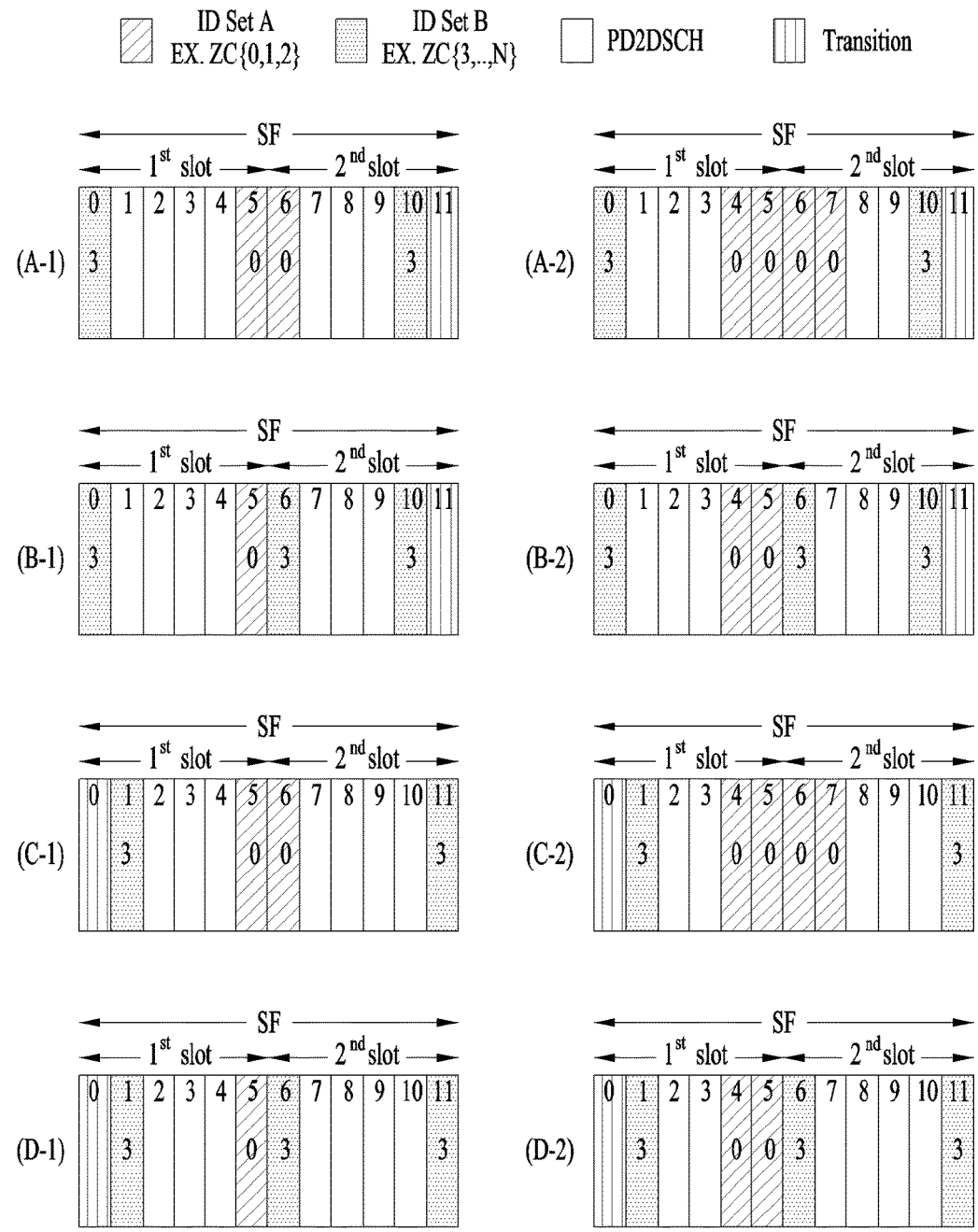
FIG. 16 is a diagram for an embodiment of an extended CP case according to one embodiment of the present invention.

In case of an extended CP, several representative embodiments are explained in the following with reference to FIG. 16. FIGS. 16 (a) and (b) correspond to a case that a transition symbol is located at the very last symbol and FIGS. 16 (c) and (d) correspond to a case that a transition symbol is located at the very first symbol. In FIG. 16, similar to a normal CP, symbols of the ID set A are located at a slot boundary symbol and symbols of the ID set B are configured to be arranged with a same interval if possible. Moreover, since arrangement of the ID sets shown in FIG. 16 is identical to what is mentioned earlier in FIGS. 12 and 13, explanation on the details is replaced with the aforementioned contents.

Meanwhile, instead of using three symbols of the ID set B as shown in FIG. 12, FIG. 13, FIGS. 16 (B) and (D), it may be more preferable to obtain a gain via a row coding rate in a manner of using two symbols of the ID set B and allocating the remaining symbol to a physical D2D synchronization channel (hereinafter, PD2DSCH) for D2D. In this case, in order to achieve optimized channel estimation performance, similar to a UL DMRS (uplink de-modulation reference signal) of LTE-A, it may be able to use a center symbol of a slot while two symbols of the ID set B are used. And, it may be more preferable to locate a PD2DSCH at a neighbor symbol where channel estimation is most accurate if possible, instead of a PSS/SSS for D2D (hereinafter, PD2DSS/SD2DSS).

Figure 17:
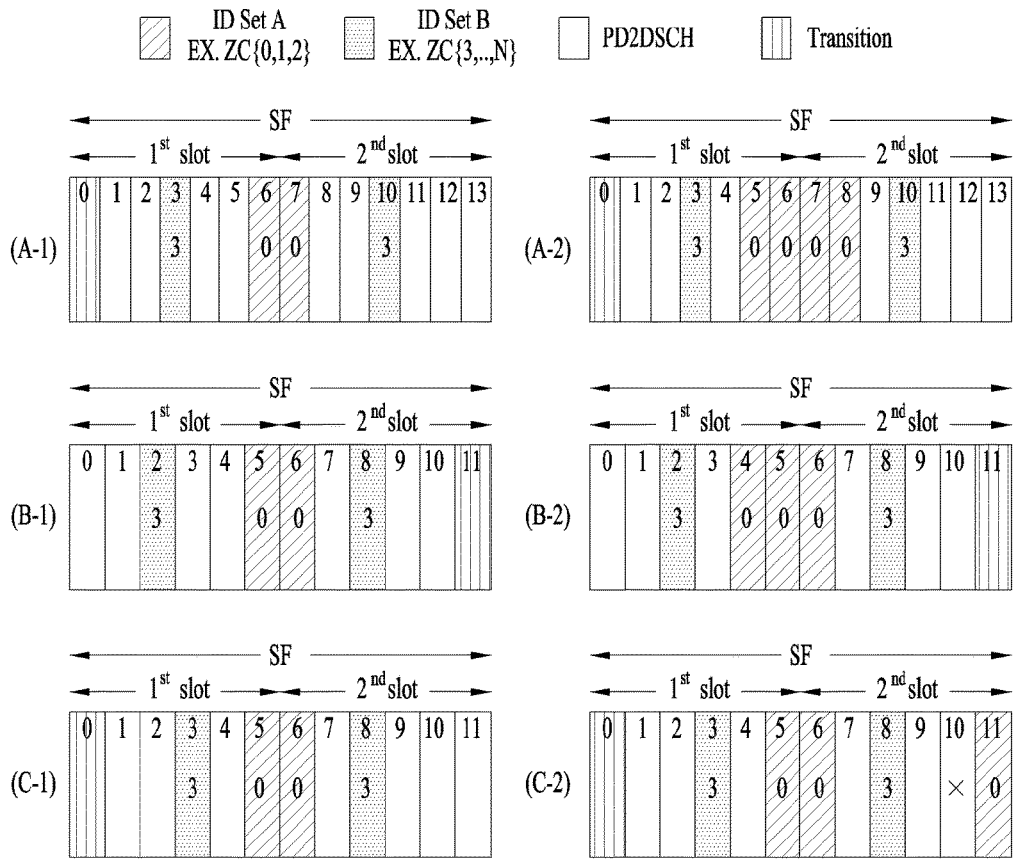
FIG. 17 is a diagram for a case of allocating two symbols of an ID set B according to one embodiment of the present invention.

FIG. 17 is a diagram for a case of allocating two symbols of an ID set B according to one embodiment of the present invention. FIG. 17 (a) shows a case that symbols of the ID set B are located at a location similar to a location of a UL DMRS in a normal CP. FIG. 17 (A-1) shows a case that the number of symbols of an ID set A corresponds to 2 and FIG. 17 (A-2) shows a case that the number of symbols of the ID set A corresponds to 4. Hence, synchronization performance may have a difference according to a difference in the number of the symbols. FIG. 17 (A) shows a case that a transition symbol is located at the very first symbol (OFDM symbol index #0) only. Yet, although the transition symbol is located at the very last symbol (OFDM symbol index #13), since it is a symmetrical structure, it is not necessary to give a change to a D2DSS.

FIG. 17 (b) shows a case that a transition symbol is located at the very last symbol and symbols of the ID set B are located at a location similar to a location of a UL DMRS in an extended CP. FIG. 17 (B-1) shows a case that the number of symbols of an ID set A corresponds to 2 and FIG. 17 (B-2) shows a case that the number of symbols of the ID set A corresponds to 3. Referring to FIG. 17 (B-2), an additional symbol of the ID set A is located at an OFDM symbol #4 compared to FIG. 17 (B-1). This is intended to make an OFDM symbol #7 to be used for a PD2DSCH since the OFDM symbol #7 corresponds to a symbol of which channel estimation performance is good, because that the OFDM #7 is adjacent to the symbol of the ID set B.

FIG. 17 (C-1) shows an example of an extended CP that a transition symbol is located at the very first symbol. In order to maintain an equal interval characteristic between available symbols, a symbol position of the ID set B of a first slot is changed to #3. In this case, it is necessary to increase the number of symbols of the ID set A to secure time synchronization performance. In this case, it is preferable to map a farthest symbol #11 first rather than use such an adjacent symbol as a symbol #4 or a symbol #7. In particular, in case of using 3 symbols of the ID set A, it may be able to additionally use #11. In case of using 4 symbols of the ID set A, it may use the symbol #11 and additionally use a second farthest #10 symbol (a symbol represented as x).

Meanwhile, in case of FIG. 17, a symbol for configuring a separate AGC does not exist. In this case, a first symbol (symbol #0 or #1) except a transition symbol can perform a role of transmitting a PD2DSCH and a role of a training signal for AGC at the same. In particular, although a first symbol of the PD2DSCH is wasted for AGC configuration, it is able to normally perform decoding since the first symbol has a low coding rate characteristic.

Moreover, in the aforementioned embodiments of the present invention, a same ID value is used in the symbols of the ID set A and the symbols of the ID set B. Yet, if a sequence including an identical ID is repeated, a timing error may occur.

Figure 18:
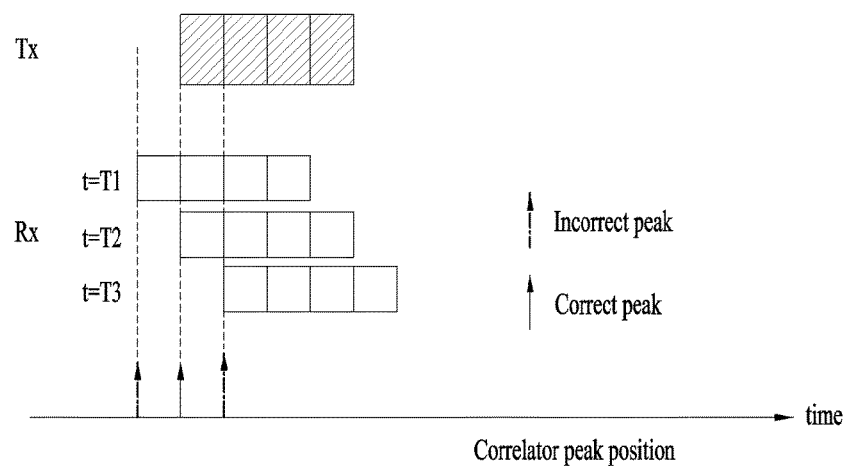
FIG. 18 is a diagram for explaining a timing error to be explained in the present invention.

FIG. 18 is a diagram for explaining a timing error to be explained in the present invention. As shown in FIG. 18, although a timing is not matched as much as a symbol (or two symbols), an error of considering it as a successful timing detection may occur. Hence, it may be able to select a different ID from among an ID set depending on a symbol according to a predetermined pattern instead of using a same ID value.

Figure 19:
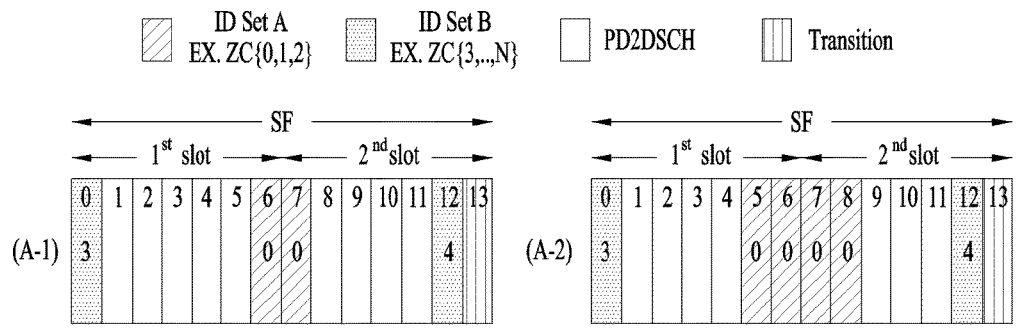
FIG. 19 is a diagram for explaining an embodiment of generating a sequence with a different ID value according to a symbol in each ID set according to one embodiment of the present invention.

FIG. 19 is a diagram for explaining an embodiment of generating a sequence with a different ID value according to a symbol in each ID set according to one embodiment of the present invention. In particular, as shown in FIG. 19, it is able to select a predetermined pattern (0-1-2-0, 3-4) from among an ID set A {0, 1, 2} and an ID set B {3, 4, . . . , N} by transforming (A-1) and (A-2) of FIG. 12. There are various predetermined patterns. A D2D Tx UE can select a pattern based on an ID and transmit the selected pattern.

Moreover, although the aforementioned embodiment considers that ID sets are divided into two sets (ID set A and ID set B), by which the present invention may be non-limited. In particular, ID sets can be divided into three or more ID sets (e.g., ID set A, ID set B, and ID set C) and an ID of a sequence can be selected from one set among the ID sets.

And, a structure of arranging an ID of a ZC sequence, which has an identical length L, to the ID set A and the ID set B in a manner of being divided has been proposed in the aforementioned embodiment. In a broad sense, a ZC sequence of a length L1 is used in symbols of the ID set A and a ZC sequence of a length L2 can be used in symbols of the ID set B.

Since the symbols of the ID set A are used for detecting time synchronization, a main purpose of the symbols of the ID set A is to reduce complexity. Hence, it is importance to select the length L1 to reduce complexity of a sequence characteristic. For example, if a length is selected to make a sequence have a symmetrical structure in frequency domain on the basis of DC frequency, a signal has a symmetrical characteristic in time domain as well. Hence, it is advantageous for reducing complexity. On the contrary, since the symbols of the ID set B are used for estimating a channel, it is important to make a length to be long to cover a region to which PD2DSCH is assigned as much as possible.

In this case, since the symbols of the ID set A and the symbols of the ID set B correspond to sequences of a different length, although ID values are identical to each other, correlation is 0.

Figure 20:
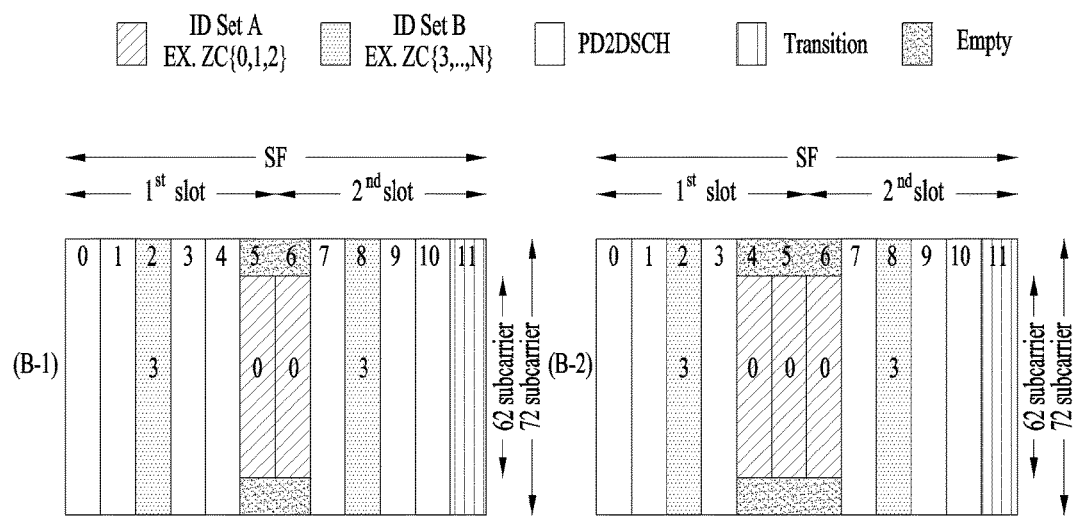
FIG. 20 is a diagram for sequences of a length different from each other according to a symbol according to one embodiment of the present invention.

FIG. 20 is a diagram for sequences of a length different from each other according to a symbol according to one embodiment of the present invention. Although FIG. 20 shows an example that a sequence of a different length is applied based on FIG. 17 (B), the example can be identically applied to other embodiments of the present invention. A sequence of the ID set A is allocated to 62 center subcarriers and a sequence of the ID set B is allocated to 72 center subcarriers. For example, the sequence of the ID set A can be mapped to 62 subcarriers in a manner of mapping a ZC sequence of a length of 63 except a DC value. In this case, assume that PD2DSCH uses all of the center subcarriers of 6RBs (72 subcarriers), In this case, in order to secure channel estimation performance from all of the 72 subcarriers, it is also necessary for the sequence of the ID set B to use a ZC sequence of a length of 72. Moreover, this can be identically extended to all of the aforementioned embodiments of the present invention. In this case, since each sequence has a completely different sequence form, it is not necessary for an ID value of the ID set A and an ID value of the ID set B to be different from each other. Although a same root index is used, it is able to generate sequences different from each other. Hence, there is no possibility of being confused in a correlation procedure.

It may be able to differently use an ID set according to priority between UEs. All available ID sets are divided into several sets and it may be able to differently use an ID set of PD2DSS and an ID set of SD2DSS according to priority (e.g., hop counter, in NW/out NW, unicast, groupcast, broadcast, etc.) of a synchronization signal. It is not mandatory that a size of each set is identical to each other.

Figure 21:
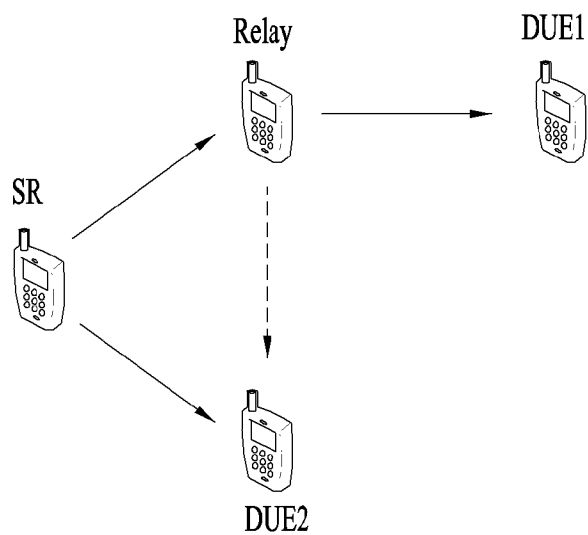
FIG. 21 is diagram for explaining transmission of a synchronization signal.

FIG. 21 is diagram for explaining transmission of a synchronization signal. Referring to FIG. 21, a synchronization signal has two types. One is a synchronization signal transmitted by a synchronization reference UE (SR UE) and the synchronization signal is generated by an index of an ID set X. Another is a synchronization signal retransmitted by a relay and the synchronization signal is transmitted by an index of an ID set Y. A DUE2 receives the two synchronization signals at the same time. Since the synchronization signal of an SR is more precise, the DUE2 preferentially performs blind detection on the synchronization signal of the ID set X. If a signal is not detected, the DUE2 detects the synchronization signal of the ID set Y. Of course, in this case, the ID sets can be used in a manner of being divided again according to a symbol. The SR UE can use a different ID index according to a symbol in a manner of dividing the ID set X into {set X1, set X2}. A relay UE can also use a different ID index according to a symbol in a manner of dividing the ID set Y into {set Y1, set Y2}.

In the following, the present invention additionally proposes a method for D2D transmission UEs performing D2D (device to device) communication to determine timing and a period of transmitting a D2D synchronization signal (hereinafter, D2DSS).

As mentioned in the foregoing description, a synchronization signal (PSS, SSS) of LTE is transmitted with a period of 5 ms and synchronization is detected by accumulating energy in a manner of combining synchronization signals of various periods with each other. On the contrary, if a synchronization signal is frequently transmitted in D2D communication, it occupies excessive resource and consumes battery of a UE. Hence, it may be preferable to transmit a synchronization signal with a relatively slow period. In particular, when a UE detects a synchronization signal, synchronization is maintained for about 500 ms in general. Hence, a transmission period of a D2DSS may become maximum several hundred ms.

For clarity, assume that a D2DSS is transmitted with a period of 100 ms in the following description. And, as shown in FIG. 21, a UE firstly transmitting a D2DSS is referred to as an SR (synchronization reference). Having received the D2DSS, a UE can relay the D2DSS to communicate with a UE located at the out of coverage or a UE of a different cell.

Figure 22:
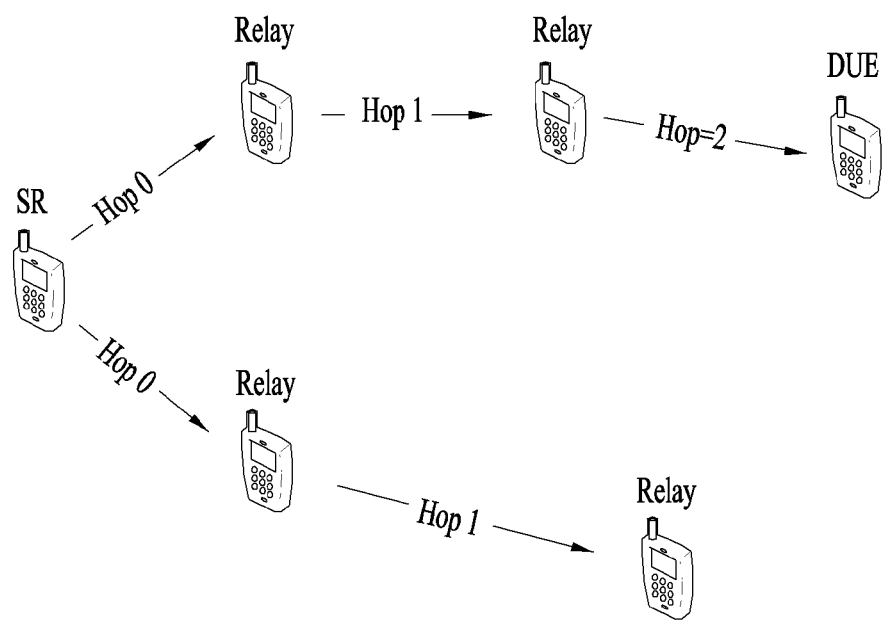
FIG. 22 is a diagram for explaining an operation of relaying a synchronization signal.

FIG. 22 is a diagram for explaining an operation of relaying a synchronization signal. As shown in FIG. 22, timing of transmitting a synchronization signal of a UE can be determined according to whether a scheme is TDD or FDD and a TDD configuration in a D2DSS of a period (e.g., 100 ms). And, timing of transmitting a synchronization signal of a UE can be determined according to whether or not the synchronization signal is relayed or a relay hop counter. In particular, a position of a subframe in which a D2DSS is transmitted is differently determined by a hop counter in a period (e.g., 100 ms). It is preferable to transmit a D2DSS in a chronological order such as SR-R1-R2- . . . relayed from the SR.

A case of arranging a D2DSS in a FDD system is explained according to embodiment of the present invention.

A synchronization signal of each relay can be transmitted with an interval of 8 ms or 4 ms according to a hop. By doing so, when a reception UE performs D2D alternately using a WAN and a TDM scheme, it is able to guarantee a subframe structure of WAN as much as possible. In particular, if a synchronization signal is transmitted with an interval of 8 ms, a single WAN HARQ process is used only for the usage of the synchronization signal. If a synchronization signal is transmitted with an interval of 4 ms, two HARQ processes are occupied.

Figure 23:
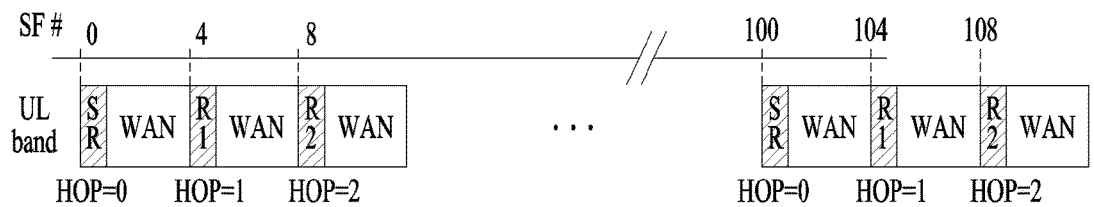
FIG. 23 is a diagram for explaining a case of arranging a D2DSS in an FDD system according to the preset invention.

FIG. 23 is a diagram for explaining a case of arranging a D2DSS in an FDD system according to the preset invention.

In FIG. 23, assume that a system corresponds to an FDD system and a D2DSS is arranged with an interval of 4 ms. If a subframe in which a D2DSS is transmitted by an SR UE corresponds to t (=0), UEs (hop=1), which have received the D2DSS, relay the D2DSS at 4 ms. Hop=2 signal is transmitted at t=8. In terms of a single relay, if timing at which a D2DSS is received corresponds to N, the relay retransmits the D2DSS at timing of N+4. In FIG. 23, among 8 HARQ processes in total, two processes including a HARQ 0={UL 0, DL 4, UL 8, . . . } and a HARQ 1={UL 4, DL 8, UL 12, . . . } are affected only (in this case, max hop=2 is assumed in the present example).

In the following, a case of arranging a D2DSS in a TDD system is explained according to embodiment of the present invention.

As a simplest example for an interval of transmitting a relay D2DSS in TDD, it may follow a UL/DL switch period of each configuration. Referring to Table 2, a same structure {DSUUD} is repeated with a period of 5 ms in a TDD configuration 1. In this case, if a number of a subframe in which a D2DSS is received corresponds to N, the D2DSS can be relayed at the timing of N+5. In case of TDD configuration 3/4/5, a relay can retransmit the D2DSS with an interval of N+10.

Similar to FDD, it may be able to configure minimum UL HARQ process to be affected only in TDD. The number of UL HARQ processes of TDD is determined according to each configuration as shown in Table 5 in the following.

TABLE 5

| TDD UL/DL configuration | Number of HARQ processes for normal HARQ operation | Number of HARQ processes for subframe bundling operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

In the following, although a HARQ timeline is displayed using Table 6 in response to a TDD configuration 1 only for clarity, the HARQ timeline can also be identically applied to other TDD UL/DL configurations according to the aforementioned example of the present invention.

TABLE 6

| | SF # | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| UL/DL | D | S | U | U | D | D | S | U | U | D | D | S | U | U | D | D | S | U | U | D |
| HARQ 0 | | | | | | | Gr | | | | | | PUS | | | | PHI | | | |
| HARQ 1 | | | | | | | | | | Gr | | | | PUS | | | | | | PHI |
| HARQ 2 | | | Gr | | | | | PUS | | | | PHI | | | | | PUS | | | |
| HARQ 3 | | | | | Gr | | | | PUS | | | | | PHI | | | | PUS | | |

In Table 6, Gr corresponds to an uplink grant (UL grant), PUS corresponds to PUSCH (re)transmission, PHI corresponds to PHI transmission, and HARQ 0/1/2/3 corresponds to a HARQ timeline consisting of 'uplink control information transmission-PUSCH transmission-PHICH transmission-PUSCH retransmission'. As mentioned above, a TDD configuration 1 has 4 HARQ processes in total. Similar to the TDD configuration 1, a prescribed time (e.g., 10 ms) is taken until 'PUSCH-PHICH (NACK)-PUSCH retransmission' in other TDD configurations of Table 6 as well. In this case, in particular, when a D2DSS is received via an uplink resource of an $N^{th}$ subframe, if the D2DSS is relayed via an uplink resource of N+10 subframe, synchronization retransmission can be performed while a minimum HARQ process (1 process) is consumed.

Table 7 shows a case that a D2DSS is received at an SF #8 of HARQ 3 among the 4 HARQ processes shown in Table 6 and the D2DSS is retransmitted at an SF #18 corresponding to N+10.

Moreover, the present invention is not limited to a method of performing retransmission after 10 ms. A scheme of occupying a single HARQ process can be identically applied to a method of performing retransmission at a multiple (20 ms, 30 ms, . . . ) of 10 ms.

Moreover, all relay UEs operate with an identical TDD configuration and have an identical UL/DL configuration at the same timing in the foregoing description of the present invention. In particular, although all UEs are located at an identical cell or a different cell, the UEs have a TDD configuration and synchronized timing identical to each other.

On the contrary, if a D2DSS relay is required for inter-cell D2D communication, a TDD configuration in which each relay operates may vary. Although a configuration is the same, a subframe number may be different from each other.

Figure 24:
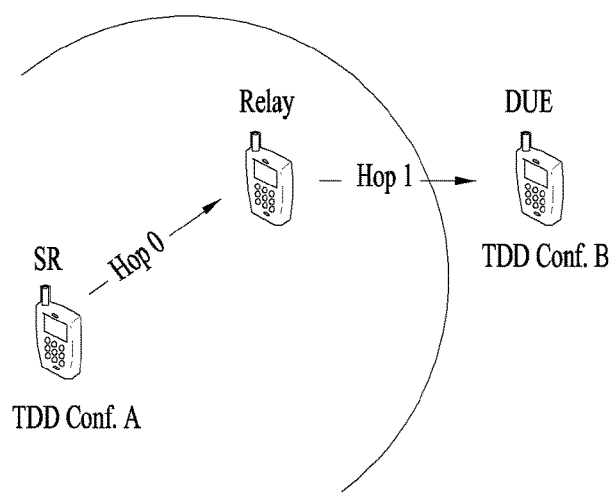
FIG. 24 is a diagram for explaining inter-cell D2D communication between UEs to which a different TDD configuration is set.

FIG. 24 is a diagram for explaining inter-cell D2D communication between UEs to which a different TDD configuration is set. When it is assumed that uplink subframe timing between UEs is matched in such a situation as FIG. 24, if a D2DSS, which is received at timing N from a neighboring cell, is retransmitted in an SF corresponding to N+10, the D2DSS can be retransmitted using a single HARQ process of a relay. Similarly, if a D2DSS is transmitted with an interval of N+20, N+30, . . . , it may also be able to use a single HARQ process only.

Figure 25:
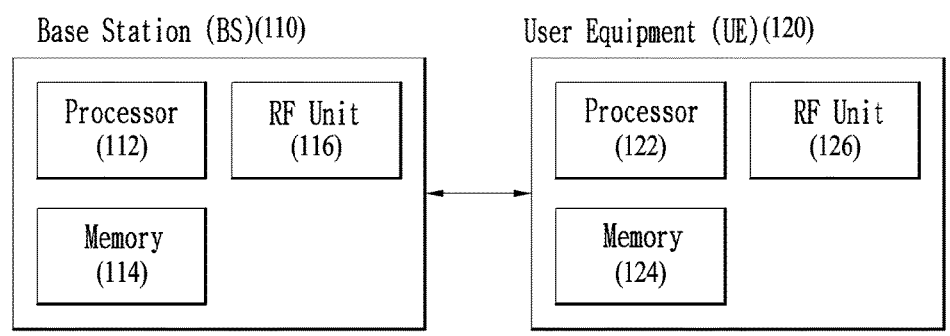
FIG. 25 illustrates a base station and user equipment applicable to an embodiment of the present invention.

FIG. 25 is a diagram of a base station and a user equipment applicable to one embodiment of the present invention. If a relay is included in a wireless communication system, a communication in backhaul link is performed between a base station and the relay and a communication in access link is performed between the relay and a user equipment. Therefore, the base station or user equipment shown in the drawing can be substituted with the relay in some cases.

Referring to FIG. 25, a wireless communication system includes a base station (BS) 110 and a user equipment (UE) 120. The base station 110 includes a processor 112, a

TABLE 7

| | SF # | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| UL/DL | D | S | U | U | D | D | S | U | U | D | D | S | U | U | D | D | S | U | U | D |
| HARQ 0 | | | | | | | Gr | | | | | | PUS | | | | PHI | | | |
| HARQ 1 | | | | | | | | | | Gr | | | | PUS | | | | | | PHI |
| HARQ 2 | | | Gr | | | | | PUS | | | | PHI | | | | | PUS | | | |
| D2DSS | | | | | | | | | SSRx | | | | | | | | | | SSTx | |

If HARQ 0/1/2 and a D2DSS shown in Table 7 and HARQ process shown in Table 6 are compared, it is able to know that a D2DSS is transmitted and received using a HARQ 3 only while HARQ 0/1/2 of WAN (shown in Table 6) are maintained as it is.

memory 114 and an RF (radio frequency) unit 116. The processor 112 can be configured to implement the procedures and/or methods proposed by the present invention. The memory 114 is connected to the processor 112 and stores various kinds of informations related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of informations related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method of transmitting and receiving a synchronization signal for D2D (device-to-device) communication in a wireless communication system and an apparatus therefor are described centering on examples applied to 3GPP LTE system, it may be applicable to various wireless communication systems as well as to the 3GPP LTE system.

What is claimed is:

1. A method of detecting a synchronization signal by a user equipment (UE) for device-to-device (D2D) communication in a wireless communication system, the method comprising;
    detecting, by the UE, a first synchronization signal and a second synchronization signal in a specific subframe during a synchronization signal period set for the D2D communication,
    wherein the second synchronization signal is located at a start symbol or an end symbol of the specific subframe, and
    wherein, when the second synchronization signal is located at the start symbol of the specific subframe, the second synchronization signal is configured to be located at two contiguous symbols; and
    performing, by the UE, a channel estimation based on the second synchronization signal located at a symbol next to the start symbol,
    wherein the first synchronization signal is generated based on a first root index set among predefined root index sets,
    wherein the second synchronization signal is generated based on a second root index set among the predefined root index sets, and
    wherein the first root index set and the second root index set are configured by a different index.

2. The method of claim 1, wherein the first synchronization signal is located at a slot boundary between a first slot and a second slot of the specific subframe.

3. The method of claim 1, wherein the second synchronization signal is further located at a slot boundary between a first slot and a second slot of the specific subframe.

4. The method of claim 1, wherein a transition symbol is allocated to a start symbol or an end symbol of the specific subframe.

5. The method of claim 1, wherein the first synchronization signal is used to obtain at least one of first time domain synchronization or first frequency domain synchronization for the D2D communication.

6. The method of claim 5, wherein the second synchronization signal is used to obtain at least one of second time domain synchronization or second frequency domain synchronization based on at least one of the detected first time domain synchronization or the first frequency domain synchronization.

7. The method of claim 1, wherein the first synchronization signal and the second synchronization signal are determined by identification (ID) values different in each symbol according to a predefined pattern.

8. The method of claim 1, wherein the first synchronization signal and the second synchronization signal are allocated using sequences of different lengths.

9. The method of claim 1, wherein an order of detecting the first synchronization signal and the second synchronization signal is determined according to a priority predetermined in the UE.

10. The method of claim 1, wherein a size of the second root index set is greater than a size of the first root index set.

11. A user equipment detecting a synchronization signal for device-to-device (D2D) communication in a wireless communication system, the user equipment comprising:
    a transmitter and a receiver; and
    a processor, wherein the processor is configured to:
        detect a first synchronization signal and a second synchronization signal in a specific subframe during a synchronization signal period set for the D2D communication, wherein the second synchronization signal is located at a start symbol or an end symbol of the specific subframe, and
   wherein, when the second synchronization signal is located at the start symbol of the specific subframe, the second synchronization signal is configured to be located at two contiguous symbols, and
   perform a channel estimation based on the second synchronization signal located at a symbol next to the start symbol,
wherein the first synchronization signal is generated based on a first root index set among predefined root index sets,
wherein the second synchronization signal is generated based on a second root index set among the predefined root index sets, and
wherein the first root index set and the second root index set are configured by a different index.

* * * * *